(12) United States Patent
Shima

(10) Patent No.: US 12,526,414 B2
(45) Date of Patent: *Jan. 13, 2026

(54) IMAGE DECODING APPARATUS, IMAGE DECODING METHOD, AND STORAGE MEDIUM

(71) Applicant: CANON KABUSHIKI KAISHA, Tokyo (JP)

(72) Inventor: Masato Shima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/775,390

(22) Filed: Jul. 17, 2024

(65) Prior Publication Data

US 2024/0373017 A1 Nov. 7, 2024

Related U.S. Application Data

(63) Continuation of application No. 17/467,946, filed on Sep. 7, 2021, now Pat. No. 12,075,049, which is a
(Continued)

(30) Foreign Application Priority Data

Mar. 11, 2019 (JP) .................................. 2019-044275

(51) Int. Cl.
*H04N 19/124* (2014.01)
*H04N 19/176* (2014.01)
(Continued)

(52) U.S. Cl.
CPC ......... *H04N 19/124* (2014.11); *H04N 19/176* (2014.11); *H04N 19/18* (2014.11); *H04N 19/619* (2014.11); *H04N 19/649* (2014.11)

(58) Field of Classification Search
None
See application file for complete search history.

(56) References Cited

U.S. PATENT DOCUMENTS

| 2014/0133553 | A1* | 5/2014 | Shima | H04N 19/157 |
| | | | | 375/240.03 |
| 2017/0353726 | A1* | 12/2017 | Tanaka | H04N 19/463 |
| 2018/0048905 | A1* | 2/2018 | Lim | H04N 19/198 |

FOREIGN PATENT DOCUMENTS

WO 2018207786 A1 11/2018

OTHER PUBLICATIONS

Xin, J., King Ngi Ngan, and Guangxi Zhu. "Combined inter-intra prediction for high definition video coding." Picture Coding Symposium. 2007. (Year: 2007).*

* cited by examiner

*Primary Examiner* — Stefan Gadomski
(74) *Attorney, Agent, or Firm* — Canon U.S.A., Inc. IP Division

(57) ABSTRACT

Decoding corresponding to a first array of quantized coefficients including an N×M array corresponding to a first block and data corresponding to a second array including an N×M array corresponding to a second block. Deriving a first array of orthogonal transform coefficients from the first array of quantized coefficients by using at least a first quantization matrix of an N×M array of elements, and derives a second array of orthogonal transform coefficients from the second array of by using at least a second quantization matrix of an N×M array of elements. Performing inverse orthogonal transform on the first array of orthogonal transform coefficients to generate a P×Q array of pixels of first prediction residuals, and performs inverse orthogonal
(Continued)

transform on the second array of orthogonal transform coefficients to generate an N×M array of pixels of second prediction residuals.

18 Claims, 16 Drawing Sheets

Related U.S. Application Data continuation of application No. PCT/JP2020/008359, filed on Feb. 28, 2020.

(51) Int. Cl.
*H04N 19/18* (2014.01)
*H04N 19/60* (2014.01)
*H04N 19/61* (2014.01)

FIG.8A

| 1 | 2 | 3 | 4 | 5 | 6 | 7 | 8 |
|---|---|---|---|---|---|---|---|
| 2 | 3 | 4 | 5 | 6 | 7 | 8 | 9 |
| 3 | 4 | 5 | 6 | 7 | 8 | 9 | 10 |
| 4 | 5 | 6 | 7 | 8 | 9 | 10 | 11 |
| 5 | 6 | 7 | 8 | 9 | 10 | 11 | 12 |
| 6 | 7 | 8 | 9 | 10 | 11 | 12 | 13 |
| 7 | 8 | 9 | 10 | 11 | 12 | 13 | 14 |
| 8 | 9 | 10 | 11 | 12 | 13 | 14 | 15 |

| -7 | 1 | 0 | 1 | 0 | 0 | 1 | 0 | 0 | 0 | 1 | 0 | 0 | 0 | 0 | ... |
|----|---|---|---|---|---|---|---|---|---|---|---|---|---|---|-----|

| VALUE TO BE ENCODED | BINARY CODE |
|---|---|
| ... | ... |
| -5 | 0001011 |
| -4 | 0001001 |
| -3 | 00111 |
| -2 | 00101 |
| -1 | 011 |
| 0 | 1 |
| 1 | 010 |
| 2 | 00100 |
| 3 | 00110 |
| 4 | 0001000 |
| 5 | 0001010 |
| ... | ... |

FIG.11B

| VALUE TO BE ENCODED | BINARY CODE |
|---|---|
| ... | ... |
| -5 | 0001011 |
| -4 | 0001001 |
| -3 | 00111 |
| -2 | 0010 |
| -1 | 011 |
| 0 | 11 |
| 1 | 10 |
| 2 | 010 |
| 3 | 00110 |
| 4 | 0001000 |
| 5 | 0001010 |
| ... | ... |

FIG.12A

| 1 | 2 | 3 | 4 | 5 | 6 | 7 | 8 |
|---|---|---|---|---|---|---|---|
| 2 | 3 | 4 | 5 | 6 | 7 | 8 | 9 |
| 3 | 4 | 5 | 6 | 7 | 8 | 9 | 10 |
| 4 | 5 | 6 | 7 | 8 | 9 | 10 | 11 |
| 5 | 6 | 7 | 8 | 9 | 10 | 11 | 12 |
| 6 | 7 | 8 | 9 | 10 | 11 | 12 | 13 |
| 7 | 8 | 9 | 10 | 11 | 12 | 13 | 14 |
| 8 | 9 | 10 | 11 | 12 | 13 | 14 | 15 |

IMAGE DECODING APPARATUS, IMAGE DECODING METHOD, AND STORAGE MEDIUM

CROSS-REFERENCE TO RELATED APPLICATIONS

This application is a Continuation of U.S. patent application Ser. No. 17/467,946, filed on Sep. 7, 2021, which is a Continuation of International Patent Application No. PCT/JP2020/008359, filed Feb. 28, 2020, which claims the benefit of Japanese Patent Application No. 2019-044275, filed Mar. 11, 2019, both of which are hereby incorporated by reference herein in their entirety.

BACKGROUND OF THE INVENTION

Field of the Invention

The present invention relates to an image encoding technique.

Background Art

A High Efficiency Video Coding (HEVC) encoding method (hereinafter, referred to as HEVC) is known as an encoding method for compressing a moving image. HEVC uses basic blocks having a size greater than that of conventional macroblocks (16×16 array of pixels) for improved encoding efficiency. The large-sized basic blocks are called coding tree units (CTUs) and have a maximum size of a 64×64 array of pixels. A CTU is further divided into subblocks that are units of prediction and transform.

In HEVC, quantization matrices are used to assign weights to orthogonally-transformed coefficients (hereinafter, referred to as orthogonal transform coefficients) based on frequency components. The use of the quantization matrices can enhance compression efficiency while maintaining image quality, by reducing data on high frequency components where degradation is less noticeable to the human vision more than data on low frequency components. Japanese Patent Application Laid-Open No. 2013-38758 discusses a technique for encoding information indicating such quantization matrices.

International standardization of a more efficient encoding method as a successor to HEVC has recently been started. Specifically, the Joint Video Experts Team (JVET) established by the International Organization for Standardization and the International Electrotechnical Commission (ISO/IEC) and the ITU Telecommunication Standardization Sector (ITU-T) has been promoting standardization of a Versatile Video Coding (VVC) encoding method (hereinafter, VVC). For this standardization, a new technique (hereinafter, referred to as zeroing out) of reducing the amount of code for improved encoding efficiency by forcefully setting the orthogonal transform coefficients of high frequent components to 0 if the block size in performing orthogonal transform is large has been under study.

Like HEVC, the introduction of quantization matrices into VVC has also been studied. However, the quantization matrices in HEVC are predicated on a method for performing quantization using a quantization matrix having the same size as that of conventional orthogonal transform, and is not able to support zeroing out that is the new technique of setting some of the orthogonal transform coefficients to zero. There has thus been an issue that zeroed-out orthogonal transform coefficients are not capable of quantization control based on frequency components, and subjective image quality is unable to be improved.

CITATION LIST

Patent Literature

PTL 1: Japanese Patent Application Laid-Open No. 2013-38758

SUMMARY OF THE INVENTION

For example, the following configuration is provided to improve subjective image quality even if the technique of forcefully setting some of the orthogonal transform coefficients to 0 is used, by enabling quantization processing using a quantization matrix corresponding to the technique. In other words, an image decoding apparatus capable of decoding an image from a bitstream in units of a plurality of blocks including a first block of a P×Q (P and Q are integers) array of pixels and a second block of an N×M (N is an integer satisfying N<P, and M is an integer satisfying M<Q) array of pixels includes a decoding unit configured to decode data corresponding to a first array of quantized coefficients and data corresponding to a second array of quantized coefficients from the bitstream, the first array of quantized coefficients including an N×M array of quantized coefficients corresponding to the first block, the second array of quantized coefficients including an N×M array of quantized coefficients corresponding to the second block, an inverse quantization unit configured to derive a first array of orthogonal transform coefficients from the first array of quantized coefficients by using at least a first quantization matrix of an N×M array of elements, and derive a second array of orthogonal transform coefficients from the second array of quantized coefficients by using at least a second quantization matrix of an N×M array of elements, and an inverse orthogonal transform unit configured to generate a P×Q array of pixels of first prediction residuals corresponding to the first block by performing inverse orthogonal transform on the first array of orthogonal transform coefficients, and generate an N×M array of pixels of second prediction residuals corresponding to the second block by performing inverse orthogonal transform on the second array of orthogonal transform coefficients, wherein the first quantization matrix of the N×M array of elements is different from the second quantization matrix of the N×M array of elements.

Moreover, the following configuration is provided, for example. An image encoding apparatus capable of encoding an image in units of a plurality of blocks including a first block of a P×Q (P and Q are integers) array of pixels and a second block of an N×M (N is an integer satisfying N<P, and M is an integer satisfying M<Q) array of pixels includes an orthogonal transform unit configured to generate at least a first array of orthogonal transform coefficients by performing orthogonal transform on a P×Q array of pixels of prediction residuals corresponding to the first block, and generate a second array of orthogonal transform coefficients by performing orthogonal transform on an N×M array of pixels of prediction residuals corresponding to the second block, a quantization unit configured to generate a first array of quantized coefficients including an N×M array of quantized coefficients by quantizing the first array of orthogonal transform coefficients using at least a first quantization matrix of an N×M array of elements, and generate a second array of quantized coefficients including an N×M array of quantized coefficients by quantizing the second array of orthogonal transform coefficients using at least a second quantization matrix of an N×M array of elements, and an encoding unit configured to encode data corresponding to the first array of quantized coefficients including the N×M array of quantized coefficients corresponding to the first block and data corresponding to the second array of quantized coefficients including the N×M array of quantized coefficients corresponding to the second block, wherein the first quantization matrix of the N×M array of elements is different from the second quantization matrix of the N×M array of elements.

Further features of the present invention will become apparent from the following description of exemplary embodiments with reference to the attached drawings.

BRIEF DESCRIPTION OF THE DRAWINGS

FIG. 8A is a diagram illustrating an example of a quantization matrix used in the first exemplary embodiment and the second exemplary embodiment.

FIG. 8B is a diagram illustrating an example of a quantization matrix used in the first exemplary embodiment and the second exemplary embodiment.

FIG. 8C is a diagram illustrating an example of a quantization matrix used in the first exemplary embodiment and the second exemplary embodiment.

FIG. 10 is a diagram illustrating a difference value matrix of the quantization matrix generated in the first exemplary embodiment and the second exemplary embodiment.

FIG. 11A is a diagram illustrating an example of an encoding table used in encoding difference values of the quantization matrix.

FIG. 11B is a diagram illustrating an example of an encoding table used in encoding difference values of the quantization matrix.

FIG. 12A is a diagram illustrating another example of the quantization matrix used in the first exemplary embodiment and the second exemplary embodiment.

FIG. 12B is a diagram illustrating another example of the quantization matrix used in the first exemplary embodiment and the second exemplary embodiment.

FIG. 12C is a diagram illustrating another example of the quantization matrix used in the first exemplary embodiment and the second exemplary embodiment.

DESCRIPTION OF THE EMBODIMENTS

Exemplary embodiments of the present invention will be described with reference to the accompanying drawings. Note that the configurations described in the following exemplary embodiments are just examples, and the present invention is not limited to the configurations described in the following exemplary embodiments. Terms such as a basic block, a subblock, a quantization matrix, and a base quantization matrix are used in the exemplary embodiments for the sake of convenience, and other terms may be used as appropriate without changing their meanings. For example, a basic block and a subblock may be referred to as a basic unit and a sub unit, or simply as a block or a unit. In the following description, a rectangle refers, as typically defined, to a quadrangle having four right interior angles and two diagonals of the same length. A square refers to, as typically defined, to a rectangle or quadrangle of which all the four angles are the same and all the four sides are the same. In other words, a square is a kind of rectangle.

First Exemplary Embodiment

An exemplary embodiment of the present invention will be described below with reference to the drawings.

Zeroing out will initially be described in more detail. Zeroing out is processing for forcefully setting some of the orthogonal transform coefficients of a block to be encoded to 0 as described above. For example, suppose that the block to be encoded is a block of 64×64 array of pixels in an input image (picture). Here, the orthogonal transform coefficients also have a size of a 64×64 array. Zeroing out is processing for performing encoding, for example, by assuming some of the 64×64 array of orthogonal transform coefficients to be 0 even if the results of the orthogonal transform are not zero in value. For example, low frequency components corresponding to a predetermined upper left range of the two-dimensional orthogonal transform coefficients, including a direct-current (DC) component, are excluded from the forceful zeroing, and the orthogonal transform coefficients corresponding to the frequency components higher, in frequency, than the low frequency components are constantly set to 0.

Figure 1:
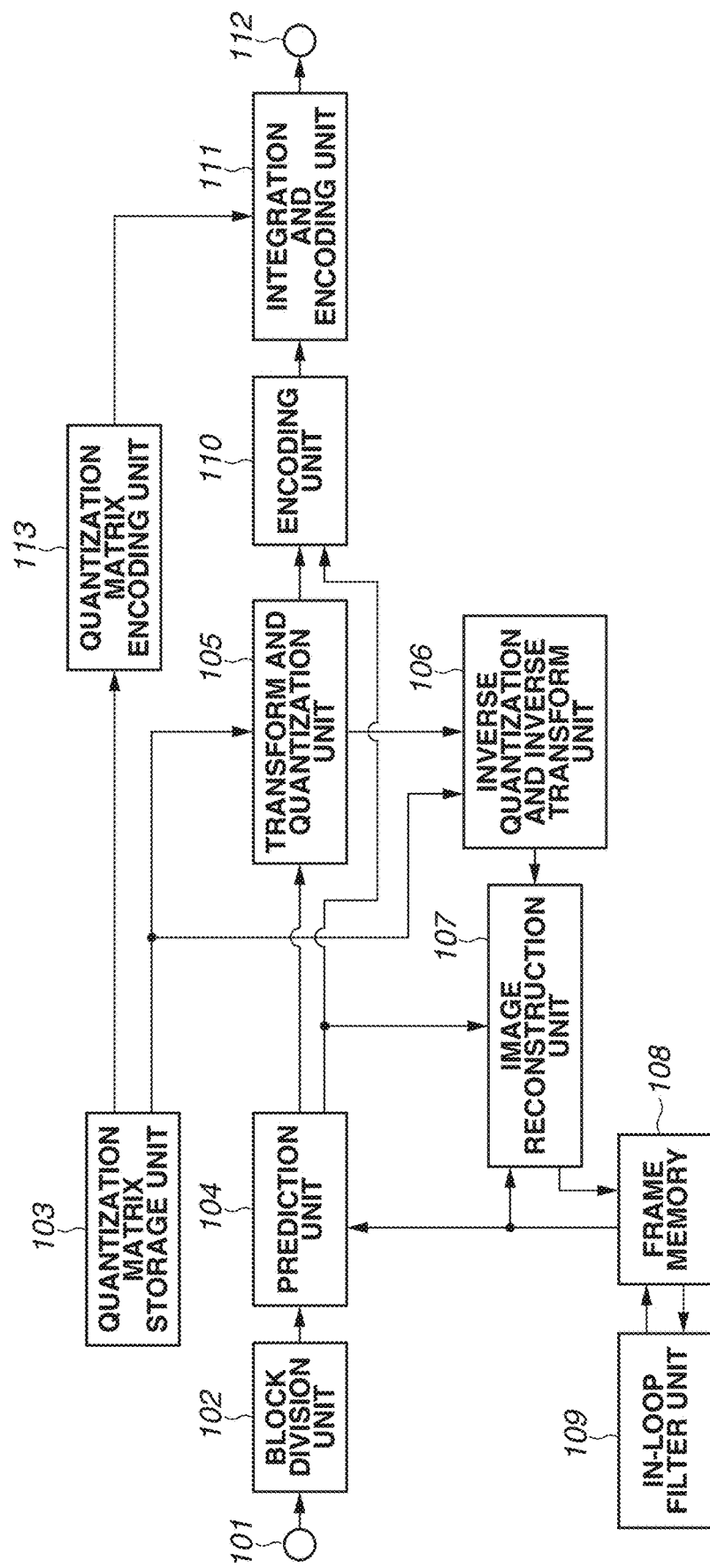
FIG. 1 is a block diagram illustrating a configuration of an image encoding apparatus according to a first exemplary embodiment.

Next, an image encoding apparatus according to the present exemplary embodiment will be described. FIG. 1 is a block diagram illustrating the image encoding apparatus according to the present exemplary embodiment. In FIG. 1, image data is input to a terminal 101.

A block division unit 102 divides an input image into a plurality of basic blocks and outputs the images in units of the basic blocks to a subsequent stage.

A quantization matrix storage unit 103 generates and stores quantization matrices. As employed herein, the quantization matrices are intended to assign weights to quantization processing on orthogonal transform coefficients based on frequency components. For example, quantization steps for the orthogonal transform coefficients in the quantization processing to be described below are assigned weights by multiplying a scale value (quantization scale) based on a reference parameter value (quantization parameter) by the values of the respective components in a quantization matrix.

Figure 8B:
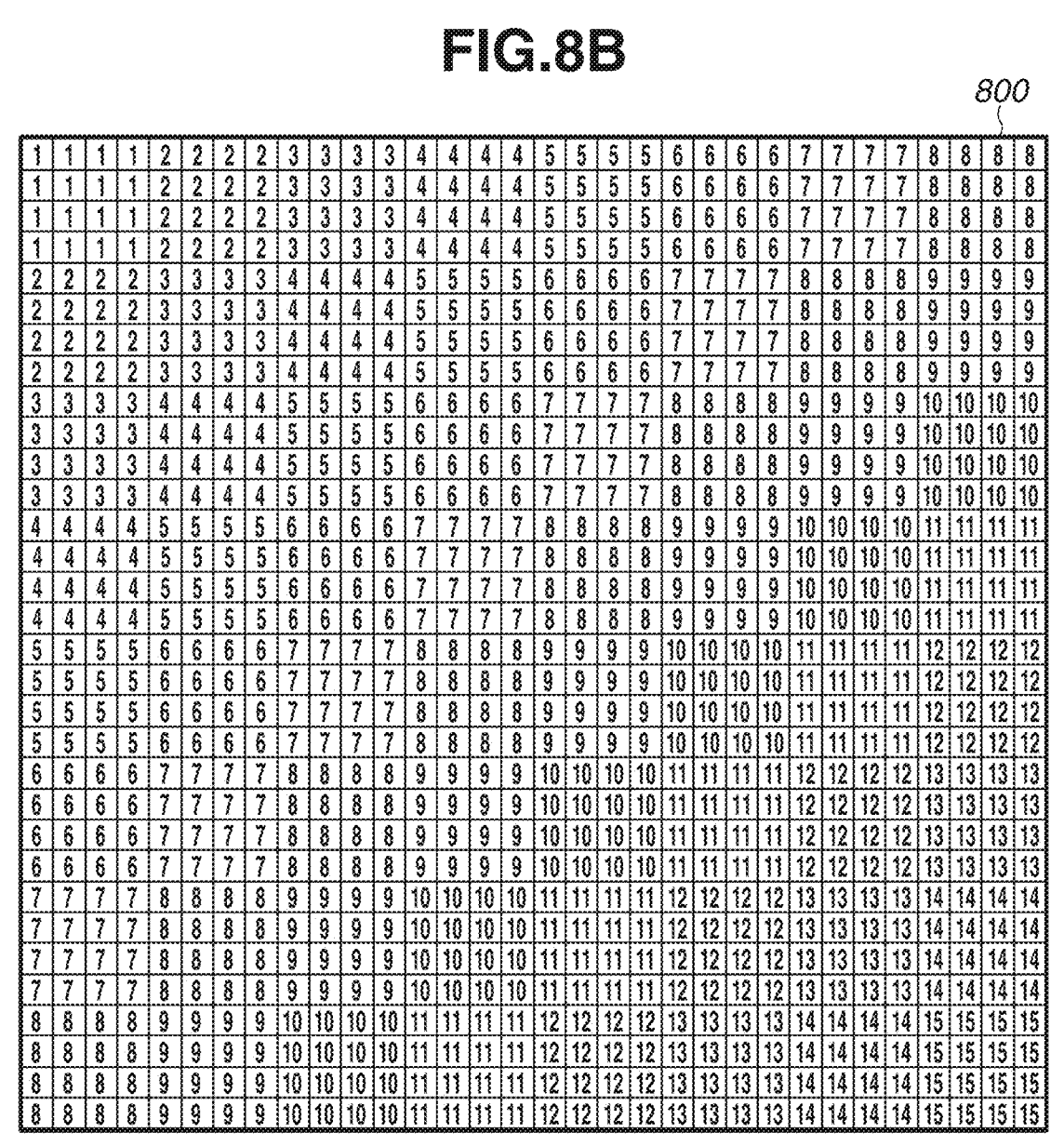
Figure 8C:
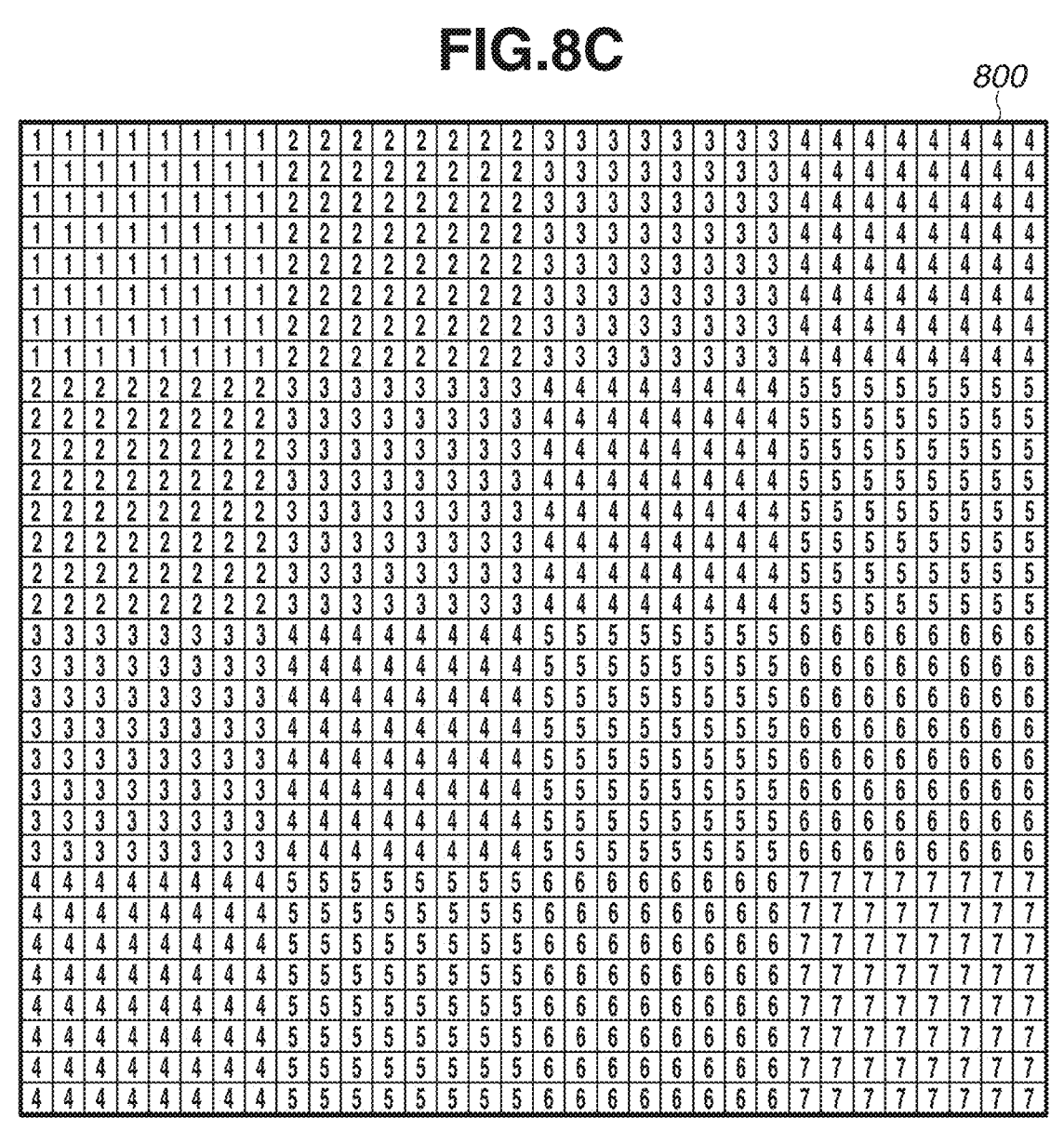

The method for generating the quantization matrices stored in the quantization matrix storage unit 103 is not limited in particular. For example, the user may input information indicating the quantization matrices. The image encoding apparatus may calculate the quantization matrices from characteristics of an input image. Quantization matrices specified in advance as initial values may be used. In the present exemplary embodiment, two types of two-dimensional quantization matrices of a 32×32 array illustrated in FIGS. 8B and 8B, generated by expanding a base quantization matrix of a 8×8 array illustrated in FIG. 8A, are generated and stored in addition to the base quantization matrix. The quantization matrix of FIG. 8B is a quantization matrix of a 32×32 array expanded fourfold by vertically and horizontally repeating each element of the base quantization matrix of a 8×8 array of FIG. 8A four times. On the other hand, the quantization matrix of FIG. 8C is a quantization matrix of a 32×32 array expanded by vertically and horizontally repeating each element in the top left 4×4 array section of the base quantization matrix of FIG. 8A eight times.

As described above, the base quantization matrix is a quantization matrix used not only to quantize a pixel subblock of a 8×8-array but also to generate the quantization matrices greater than the base quantization matrix in size. While the base quantization matrix has a size of 8×8 array, this size is not restrictive. Moreover, different base quantization matrices may be used depending on the subblock size. For example, if three types of subblocks, namely, subblocks of 8×8, 16×16, and 32×32 arrays are used, respective corresponding three types of base quantization matrices can be used.

A prediction unit 104 determines subblock division about the image data in units of basic blocks. More specifically, the prediction unit 104 determines whether to divide a basic block into subblocks, and if the basic block is to be divided, determines how to divide the basic block. If the basic block is to not be divided into subblocks, the resulting subblock has the same size as the basic block. Subblocks may be square or rectangular other than square (non-square).

The prediction unit 104 then generates predicted image data by performing intra-prediction that is intraframe prediction, inter-prediction that is interframe prediction, or the like in units of subblocks.

For example, the prediction unit 104 selects a prediction method to be performed on a subblock from between the intra-prediction and the inter-prediction, and performs the selected prediction to generate predicted image data on the subblock. Note that the prediction methods to be used are not limited thereto, and prediction may be made by combining the intra-prediction and the inter-prediction.

The prediction unit 104 further calculates prediction residuals from the input image data and the predicted image data, and outputs the prediction residuals. For example, the prediction unit 104 calculates differences between the pixel values of a subblock and the respective pixel values of the predicted image data generated by prediction on the subblock, and calculates the differences as the prediction residuals.

The prediction unit 104 also outputs information needed for prediction, such as information indicating the state of division of subblocks, a prediction mode indicating the prediction method of the subblock, and information such as a motion vector, along with the prediction residuals. Such pieces of information needed for prediction will hereinafter be referred to collectively as prediction information.

A transform and quantization unit 105 orthogonally transforms the prediction residuals calculated by the prediction unit 104 in units of subblocks to obtain orthogonal transform coefficients indicating the respective frequency components of the prediction residuals. The transform and quantization unit 105 further performs quantization using the quantization matrices stored in the quantization matrix storage unit 103 and the quantization parameter to obtain quantized coefficients that are quantized orthogonal transform coefficients. The function of performing orthogonal transform and the function of performing quantization may be configured as separate configurations.

An inverse quantization and inverse transform unit 106 reconstructs the orthogonal transform coefficients by inversely quantizing the quantized coefficients output from the transform and quantization unit 105 using the quantization matrices stored in the quantization matrix storage unit 103 and the quantization parameter. The inverse quantization and inverse transform unit 106 further performs inverse orthogonal transform to reconstructs the prediction residuals. Such processing for reconstructing (deriving) orthogonal transform coefficients using the quantization matrices and the quantization parameter will be referred to as inverse quantization. The function of performing inverse quantization and the function of performing inverse quantization may be configured as separate configurations. Information for an image decoding apparatus to derive the quantization parameter is also encoded into a bitstream by an encoding unit 110.

A frame memory 108 stores reconstructed image data.

An image reconstruction unit 107 generates predicted image data by referring to the frame memory 108 as appropriate based on the prediction information output from the prediction unit 104. The image reconstruction unit 107 generates reconstructed image data from the predicted image data and the input prediction residuals, and outputs the reconstructed image data.

An in-loop filter unit 109 performs in-loop filtering processing such as deblocking filtering and sample adaptive offsetting on the reconstructed image, and outputs the filter-processed image.

The encoding unit 110 encodes the quantized coefficients output from the transform and quantization unit 105 and the prediction information output from the prediction unit 104 to generate code data, and outputs the code data.

A quantization matrix encoding unit 113 encodes the base quantization matrix output from the quantization matrix storage unit 103 to generate quantization matrix code data for the image decoding apparatus to derive the base quantization matrix, and outputs the quantization matrix code data.

An integration and encoding unit 111 generates header code data by using the quantization matrix code data that is the output from the quantization matrix encoding unit 113. The integration and encoding unit 111 further combines the header code data with the code data output from the encoding unit 110 to generate a bitstream, and outputs the bitstream.

A terminal 112 outputs the bitstream generated by the integration and encoding unit 111 to outside.

An image encoding operation by the foregoing image encoding apparatus will now be described. In the present exemplary embodiment, the image encoding apparatus is configured to input moving image data in units of frames. Moreover, in the description of the present exemplary embodiment, the block division unit 102 is described to divide the moving image data into basic blocks of a 64×64 array of pixels. However, this is not restrictive. For example, the basic blocks may be blocks of a 128×128 array of pixels. The basic blocks may be blocks of a 32×32 array of pixels.

Before encoding an image, the image encoding apparatus generates and encodes the quantization matrices. In the following description, for example, a horizontal direction in a quantization matrix 800 or each block will be assumed to be as an x-axis and a vertical direction a y-axis, with a right direction and a downward direction as positive. The top leftmost element of the quantization matrix 800 has coordinates (0, 0). In other words, the bottom rightmost element of abase quantization matrix of a 8×8 array has coordinates (7, 7). The bottom rightmost element of a quantization matrix of a 32×32 array has coordinates (31, 31).

The quantization matrix storage unit 103 initially generates the quantization matrices. A quantization matrix is generated based on the subblock size, the size of orthogonal transform coefficients to be quantized, and the type of prediction method. In the present exemplary embodiment, the base quantization matrix of a 8×8 array illustrated in FIG. 8A to be used to generate the quantization matrices to be described below is initially generated. Next, this base quantization matrix is expanded to generate the two types of quantization matrices of a 32×32 array illustrated in FIGS. 8B and 8C. The quantization matrix of FIG. 8B is a quantization matrix of a 32×32 array expanded fourfold by vertically and horizontally repeating each element of the base quantization matrix of a 8×8 array of FIG. 8A four times.

More specifically, in the example illustrated in FIG. 8B, the value of the top leftmost element of the base quantization matrix, 1, is assigned to each element in the range of x-coordinates of 0 to 3 and y-coordinates of 0 to 3 in the quantization matrix of a 32×32 array. The value of the bottom rightmost element of the base quantization matrix, 15, is assigned to each element in the range of x-coordinates of 28 to 31 and y-coordinates of 28 to 31 in the quantization matrix of a 32×32 array. In the example of FIG. 8B, the values of the elements in the base quantization matrix are each assigned to some of the elements in the quantization matrix of a 32×32 array.

On the other hand, the quantization matrix of FIG. 8C is a quantization matrix of a 32×32 array expanded by vertically and horizontally repeating each element in the top left 4×4 array section of the base quantization matrix of FIG. 8A eight times.

More specifically, in the example illustrated in FIG. 8C, the value of the top leftmost element of the top left 4×4 array section of the base quantization matrix, 1, is assigned to each element in the range of x-coordinates of 0 to 7 and y-coordinates of 0 to 7 in the quantization matrix of a 32×32 array. The value of the bottom rightmost element of the top left 4×4 array section of the base quantization matrix, 7, is assigned to each element in the range of x-coordinates of 24 to 31 and y-coordinates of 24 to 31 in the quantization matrix of a 32×32 array. In the example of FIG. 8C, only the values of the elements corresponding to the top left 4×4 array section (the range of x-coordinates of 0 to 3 and y-coordinates of 0 to 3) among the values of the elements in the base quantization matrix are assigned to the elements of the quantization matrix of a 32×32 array.

Note that the quantization matrices to be generated are not limited thereto. If there is a size of orthogonal transform coefficients to be quantized other than a 32×32 array, quantization matrices corresponding to the sizes of the orthogonal transform coefficients to be quantized, such as 16×16, 8×8, and 4×4 arrays may be generated. The method for determining the elements to constitute the base quantization matrix and the quantization matrices is not limited in particular. For example, predetermined initial values may be used. The elements may be individually set. The quantization matrices may be generated based on image characteristics.

The base quantization matrix and the quantization matrices generated thus are stored in the quantization matrix storage unit 103. FIG. 8B illustrates an example of the quantization matrix to be used in quantizing orthogonal transform coefficients corresponding to a subblock of a 32×32 array to be described below, and FIG. 8C an example of the quantization matrix to be used in quantizing orthogonal transform coefficients corresponding to a subblock of a 64×64 array. The thick frames 800 represent the quantization matrices. For ease of description, each quantization matrix 800 shall include a 32×32 array, i.e., 1024 pixels, and each square in the thick frame shall represent an element constituting the quantization matrix. In the present exemplary embodiment, the three types of quantization matrices illustrated in FIGS. 8B and 8C are stored in a two-dimensional form. It will be understood, however, that the elements in the quantization matrices are not limited thereto. Moreover, a plurality of quantization matrices can be stored for the same prediction method, depending on the size of orthogonal transform coefficients to be quantized or whether the encoding target is a luminance block or a color difference block. Typically, as illustrated in FIGS. 8B and 8C, elements in low frequency sections corresponding to the upper left sections of the quantization matrices are small and elements in high frequency sections corresponding to the lower right sections are large since the quantization matrices are intended to implement quantization processing based on human visual characteristics.

Figure 9:
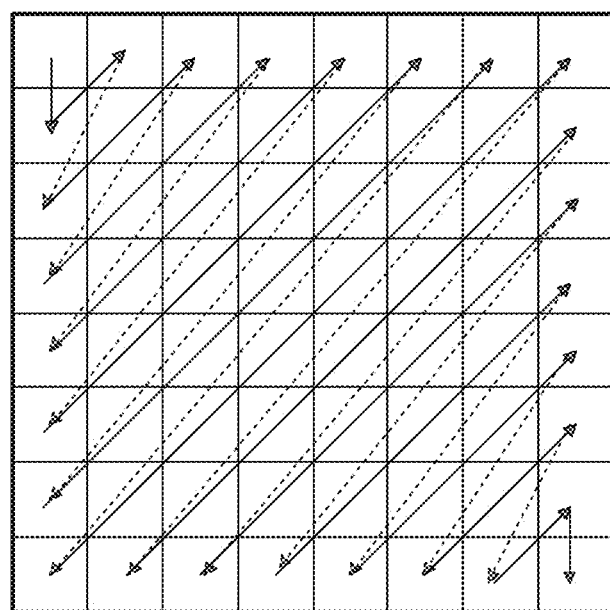
FIG. 9 is a diagram illustrating a method for scanning elements of the quantization matrix used in the first exemplary embodiment and the second exemplary embodiment.

The quantization matrix encoding unit 113 sequentially reads the elements of the base quantization matrix stored in the two-dimensional form from the quantization matrix storage unit 103, scans the elements to calculate differences, and arranges the differences in a one-dimensional matrix. In the present exemplary embodiment, with respect to the base quantization matrix illustrated in FIG. 8A, a scanning method illustrated in FIG. 9 is used to calculate differences from the elements immediately preceding in scanning order element by element. For example, the base quantization matrix of a 8×8 array illustrated in FIG. 8A is scanned by the scanning method illustrated in FIG. 9. After the first element of 1 at the top left, the element of 2 located immediately below is scanned next and a difference of +1 is calculated.

The first element of the quantization matrix (in the present exemplary embodiment, 1) is encoded by calculating a difference from a predetermined initial value (for example, 8). However, this is not restrictive, and a difference from an arbitrary value or the value of the first element itself may be used.

Figure 10:
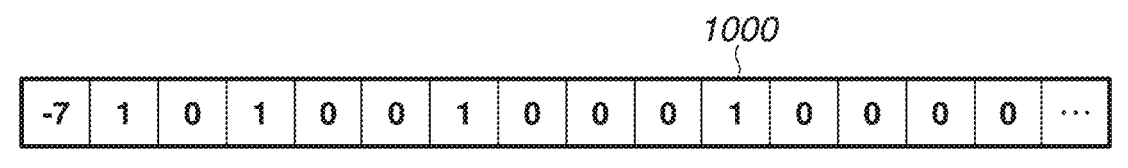

In the present exemplary embodiment, a difference matrix illustrated in FIG. 10 is thus generated from the base quantization matrix of FIG. 8A by using the scanning method of FIG. 9. The quantization matrix encoding unit 113 further encodes the difference matrix to generate quantization matrix code data. In the present exemplary embodiment, the encoding is performed by using an encoding table illustrated in FIG. 11A, whereas the encoding table is not limited thereto. For example, an encoding table illustrated in FIG. 11B may be used. The quantization matrix code data generated thus is output to the integration and encoding unit 111 at the subsequent state.

Returning to FIG. 1, the integration and encoding unit 111 encodes header information needed to encode image data, and integrates the code data on the quantization matrix with the encoded header information.

The image data is then encoded. One frame of image data input from the terminal 101 is input to the block division unit 102.

The block division unit 102 divides the input image data into a plurality of basic blocks, and outputs the images in units of basic blocks to the prediction unit 104. In the present exemplary embodiment, the images are output in units of basic blocks of a 64×64 array of pixels.

The prediction unit 104 performs prediction processing on the image data in units of basic blocks, input from the block division unit 102. Specifically, the prediction unit 104 determines subblock division as to whether to divide a basic block into smaller subblocks, and also determines the prediction mode such as intra-prediction and inter-prediction in units of subblocks.

FIG. 7 illustrates an example of a subblock division method. A thick frame 700 represents a basic block. For ease of description, the basic block shall include a 64×64 array of pixels, and each quadrangle in the thick frame shall represent a subblock. FIG. 7B illustrates an example of quadtree square subblock division. The basic block of a 64×64 array of pixels is divided into pixel subblocks of a 32×32-array. FIGS. 7C to 7F illustrate examples of rectangular subblock division. In FIG. 7C, the basic block is divided into vertically long rectangular subblocks of a 32×64 array of pixels. In FIG. 7D, the basic block is divided into horizontally long rectangular subblocks of a 64×32 array of pixels. In FIGS. 7E and 7F, the basic block is divided into rectangular subblocks at a ratio of 1:2:1. In such a manner, the encoding processing is performed by using not only square subblocks but non-square rectangular subblocks as well. Moreover, the basic block may be further divided into a plurality of square blocks, and subblock division may be performed with reference to the divided square blocks. In other words, the size of the basic block is not limited to a 64×64 array of pixels, and a plurality of sizes of basic blocks may be used.

Figure 7A:
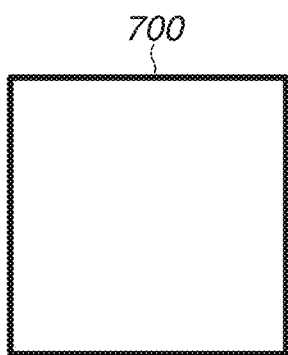
FIG. 7A is a diagram illustrating an example of subblock division used in the first exemplary embodiment and the second exemplary embodiment.
Figure 7B:
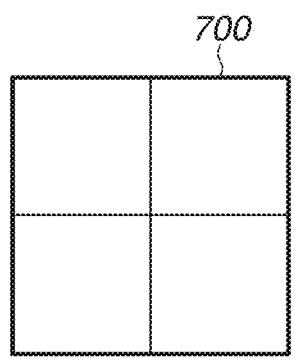
FIG. 7B is a diagram illustrating an example of subblock division used in the first exemplary embodiment and the second exemplary embodiment.
Figure 7C:
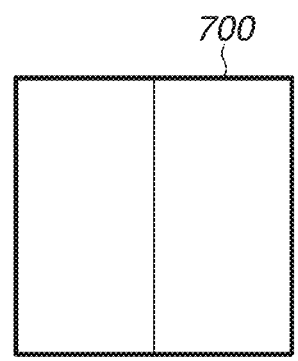
FIG. 7C is a diagram illustrating an example of subblock division used in the first exemplary embodiment and the second exemplary embodiment.
Figure 7D:
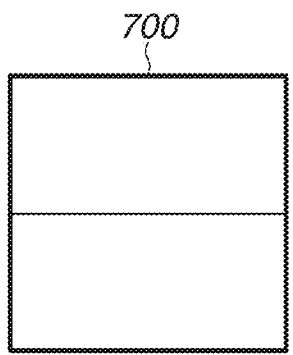
FIG. 7D is a diagram illustrating an example of subblock division used in the first exemplary embodiment and the second exemplary embodiment.
Figure 7E:
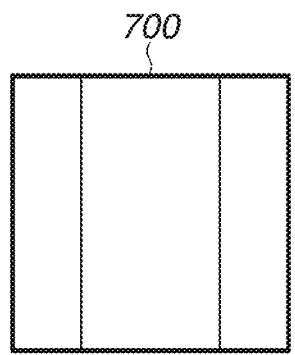
FIG. 7E is a diagram illustrating an example of subblock division used in the first exemplary embodiment and the second exemplary embodiment.
Figure 7F:
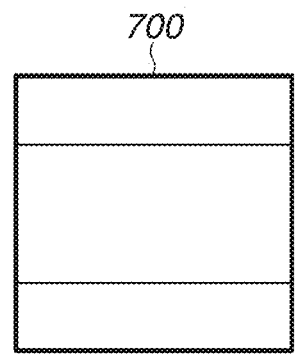
FIG. 7F is a diagram illustrating an example of subblock division used in the first exemplary embodiment and the second exemplary embodiment.

In the present exemplary embodiment, the basic block of a 64×64 array of pixels is either not divided like FIG. 7A or divided by using only the quadtree division as in FIG. 7B. However, the subblock division method is not limited thereto. Tritree division like FIGS. 7E and 7F and bitree division like FIGS. 7C and 7D may be used. If subblock division other than that of FIGS. 7A and 7B is also used, the quantization matrix storage unit 103 generates quantization matrices corresponding to the subblocks to be used. If a new base quantization matrix or matrices corresponding to the generated quantization matrices is/are also generated, the quantization matrix encoding unit 113 also encodes the new base quantization matrix or matrices.

The prediction methods of the prediction unit 104 used in the present exemplary embodiment will be described in more detail. In the present exemplary embodiment, two types of prediction methods, namely, intra-prediction and inter-prediction, are used, for example. Intra-prediction generates predicted pixels of a block to be encoded by using encoded pixels lying spatially around the block to be encoded, and also generates intra-prediction mode information indicating the used intra-prediction method among intra-prediction methods such as horizontal prediction, vertical prediction, and DC prediction. Inter-prediction generates predicted pixels of a block to be encoded by using encoded pixels in a frame or frames temporarily different from the block to be encoded, and also generates motion information indicating the frame(s) to be referred to, a motion vector, and the like. As described above, the prediction unit 104 may use a prediction method combining intra-prediction and inter-prediction.

Predicted image data is generated based on the determined prediction mode and the encoded pixels. Prediction residuals are further generated from the input image data and the predicted image data, and output to the transform and quantization unit 105. Information about the subblock division, the prediction mode, and the like is output to the encoding unit 110 and the image reconstruction unit 107 as prediction information.

The transform and quantization unit 105 performs orthogonal transform and quantization on the input prediction residuals to generate quantized coefficients. The transform and quantization unit 105 initially applies orthogonal transform processing corresponding to the subblock size to generate orthogonal transform coefficients. The transform and quantization unit 105 then generates quantized coefficients by quantizing the orthogonal transform coefficients using the quantization matrices stored in the quantization matrix storage unit 103 based on the prediction mode. More specific orthogonal transform and quantization processing is described below.

If the 32×32 array subblock division illustrated in FIG. 7B is selected, the transform and quantization unit 105 applies orthogonal transform using an orthogonal transform matrix of a 32×32 array to the 32×32 array of prediction residuals to generate 32×32 array of orthogonal transform coefficients. Specifically, the transform and quantization unit 105 performs the multiplication of an orthogonal transform matrix of a 32×32 array typified by discrete cosine transform (DCT) and the 32×32 array of prediction residuals to calculate intermediate coefficients in a form of a matrix of a 32×32 array. The transform and quantization unit 105 further performs the multiplication of the intermediate coefficients in the form of a matrix of a 32×32 array and the transpose of the foregoing orthogonal transform matrix of a 32×32 array to generate a 32×32 array of orthogonal transform coefficients. The transform and quantization unit 105 generates a 32×32 array of quantized coefficients by quantizing the generated 32×32 array of orthogonal transform coefficients using the quantization matrix of a 32×32 array illustrated in FIG. 8B and the quantization parameter. Such processing is repeated four times since the 64×64 array basic block includes four subblocks of a 32×32 array.

On the other hand, if the 64×64 array division state (no division) illustrated in FIG. 7A is selected, an orthogonal transform matrix of a 64×32 array generated by decimating the odd-numbered rows (hereinafter, referred to as odd rows) in a orthogonal transform matrix of a 64×64 array is used for the 64×64 array of prediction residuals. In other words, a 32×32 array of orthogonal transform coefficients is generated by application of the orthogonal transform using the orthogonal transform matrix of a 64×32 array generated by decimating the odd rows.

Specifically, the transform and quantization unit 105 decimates the odd rows in the orthogonal transform matrix of a 64×64 array to generate an orthogonal transform matrix of a 64×32 array. The transform and quantization unit 105 then performs the multiplication of the orthogonal transform matrix of a 64×32 array and the 64×64 array of prediction residuals to generate intermediate coefficients in a form of a matrix of a 64×32 array. The transform and quantization unit 105 performs the multiplication of the intermediate coefficients in the form of a matrix of a 64×32 array and a transpose of a 32×64 array obtained by transposing the foregoing orthogonal transform matrix of a 64×32 array to generate a 32×32 array of orthogonal transform coefficients. The transform and quantization unit 105 then performs zeroing out by using the generated 32×32 array of orthogonal transform coefficients as the coefficients in the top left section (in the range of x-coordinates of 0 to 31 and y-coordinates of 0 to 31) of a 64×64 array of orthogonal transform coefficients and setting the other coefficients to 0.

In the present exemplary embodiment, the 64×64 array of prediction residuals are thus orthogonally transformed by using an orthogonal transform matrix of a 64×32 array and a transpose of a 32×64 array obtained by transposing the orthogonal transform matrix of a 64×32 array. Zeroing out is performed by generating a 32×32 array of orthogonal transform coefficients in such a manner. The 32×32 array of orthogonal transform coefficients can thus be generated with a smaller amount of computation than by a technique of forcefully setting some of a 64×64 array of orthogonal transform coefficients generated by 64×64 array orthogonal transform to 0 if the values are not 0. In other words, the amount of computation of the orthogonal transform can be reduced compared to the case of performing orthogonal transform using the orthogonal transform matrix of a 64×64 array and encoding the result by assuming the orthogonal transform coefficients targeted for zeroing out to be 0 regardless of whether the orthogonal transform coefficients are 0. Note that while the method for calculating a 32×32 array of orthogonal transform coefficients from the 64×64 array of prediction residuals by using orthogonal transform can reduce the amount of computation, the method for zeroing out is not limited thereto and various methods can be used.

In executing the zeroing out, information indicating that the orthogonal transform coefficients in the target range of the zeroing out are 0 may be encoded, or information (such as a flag) indicating the execution of the zeroing out may simply be encoded. By decoding such information, the image decoding apparatus can decode blocks with the targets of the zeroing out as 0.

Next, the transform and quantization unit 105 generates a 32×32 array of quantized coefficients by quantizing the 32×32 array of orthogonal transform coefficients thus generated, using the 32×32 array of quantization matrix illustrated in FIG. 8C and the quantization parameter.

In the present exemplary embodiment, the quantization matrix of FIG. 8B is used for a 32×32 array of orthogonal transform coefficients corresponding to a subblock of a 32×32 array, and the quantization matrix of FIG. 8C is used for a 32×32 array of orthogonal transform coefficients corresponding to a subblock of a 64×64 array. In other words, FIG. 8B is used for a 32×32 array of orthogonal transform coefficients on which zeroing out has not been performed, and the quantization matrix of FIG. 8C is used for a 32×32 array of orthogonal transform coefficients corresponding to a 64×64 array of subblocks on which zeroing out has been performed. Note that the quantization matrices to be used are not limited thereto. The generated quantized coefficients are output to the encoding unit 110 and the inverse quantization and inverse transform unit 106.

The inverse quantization and inverse transform unit 106 reconstructs the orthogonal transform coefficients by inversely quantizing the input quantized coefficients using the quantization matrices stored in the quantization matrix storage unit 103 and the quantization parameter. The inverse quantization and inverse transform unit 106 further performs inverse orthogonal transform on the reconstructed orthogonal transform coefficients to reconstruct the prediction residuals. Like the transform and quantization unit 105, the inverse quantization and inverse transform unit 106 uses the quantization matrix corresponding to the size of the subblock to be encoded for the inverse quantization processing. More detailed inverse quantization and inverse orthogonal transform processing by the inverse quantization and inverse transform unit 106 is described below.

If the 32×32 array subblock division of FIG. 7B is selected, the inverse quantization and inverse transform unit 106 reconstructs a 32×32 array of orthogonal transform coefficients by inversely quantizing the 32×32 array of quantized coefficients generated by the transform and quantization unit 105, using the quantization matrix of FIG. 8B. The inverse quantization and inverse transform unit 106 then performs the multiplication of the foregoing transpose of a 32×32 array and the 32×32 array of orthogonal transform coefficients to calculate intermediate coefficients in a form of a matrix of a 32×32 array. The inverse quantization and inverse transform unit 106 then performs the multiplication of the intermediate coefficients in a form of a matrix of a 32×32 array and the foregoing orthogonal transform matrix of a 32×32 array to reconstruct a 32×32 array of prediction residuals. The inverse quantization and inverse transform unit 106 performs similar processing on each subblock of a 32×32 array. On the other hand, if no division is selected as in FIG. 7A, the inverse quantization and inverse transform unit 106 reconstructs a 32×32 array of orthogonal transform coefficients by inversely quantizing the 32×32 array of quantized coefficients generated by the transform and quantization unit 105, using the quantization matrix of FIG. 8C. The inverse quantization and inverse transform unit 106 then performs the multiplication of the foregoing transpose of a 32×64 array and the 32×32 array of orthogonal transform coefficients to calculate intermediate coefficients in a form of a matrix of a 32×64 array. The inverse quantization and inverse transform unit 106 performs the multiplication of the intermediate coefficients in the form of a matrix of a 32×64 array and the foregoing orthogonal transform matrix of a 64×32 array to reconstruct a 64×64 array of prediction residuals. In the present exemplary embodiment, the inverse quantization processing is performed by using a quantization matrix same as that used in the transform and quantization unit 105 based on the size of the subblock. The reconstructed prediction residuals are output to the image reconstruction unit 107.

The image reconstruction unit 107 reconstructs a predicted image by referring to data needed to reconstruct the predicted image, stored in the frame memory 108, as appropriate based on the prediction information input from the prediction unit 104. The image reconstruction unit 107 then reconstructs image data from the reconstructed predicted image and the reconstructed prediction residuals input from the inverse quantization and inverse transform unit 106, and inputs and stores the image data into the frame memory 108.

The in-loop filter unit 109 reads the reconstructed image from the frame memory 108 and performs in-loop filtering processing such as deblocking filtering. The in-loop filter unit 109 inputs and stores the filter-processed image into the frame memory 108 again.

The encoding unit 110 entropically encodes the quantized coefficients generated by the transform and quantization unit 105 and the prediction information input from the prediction unit 104 block by block to generate code data. The method for entropy encoding is not specified in particular, and Golomb encoding, arithmetic encoding, Huffman encoding, and the like can be used. The generated code data is output to the integration and encoding unit 111.

The integration and encoding unit 111 generates a bitstream by multiplexing the foregoing header code data, the code data input from the encoding unit 110, and the like. The bitstream is eventually output to outside from the terminal 112.

Figure 6A:
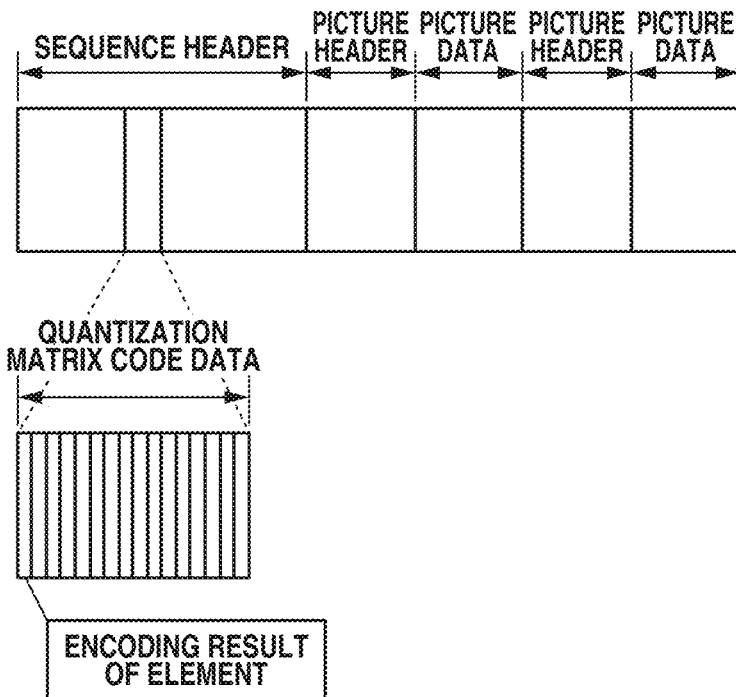
FIG. 6A is a diagram illustrating an example of a bitstream output in the first exemplary embodiment.

FIG. 6A illustrates an example of the bitstream output in the first exemplary embodiment. A sequence header includes code data on the base quantization matrix, which includes the encoding results of the respective elements. Note that the location where the code data on the base quantization matrix and the like are encoded is not limited thereto, and it will be understood that the bitstream may be configured so that such data is encoded in a picture header section or other header sections. If the quantization matrix is switched within a sequence, a new base quantization matrix can be encoded for update. In such a case, all the quantization matrices may be rewritten, or some of the quantization matrices may be changed by specifying the subblock size of the quantization matrix corresponding to the quantization matrix to be rewritten.

Figure 3:
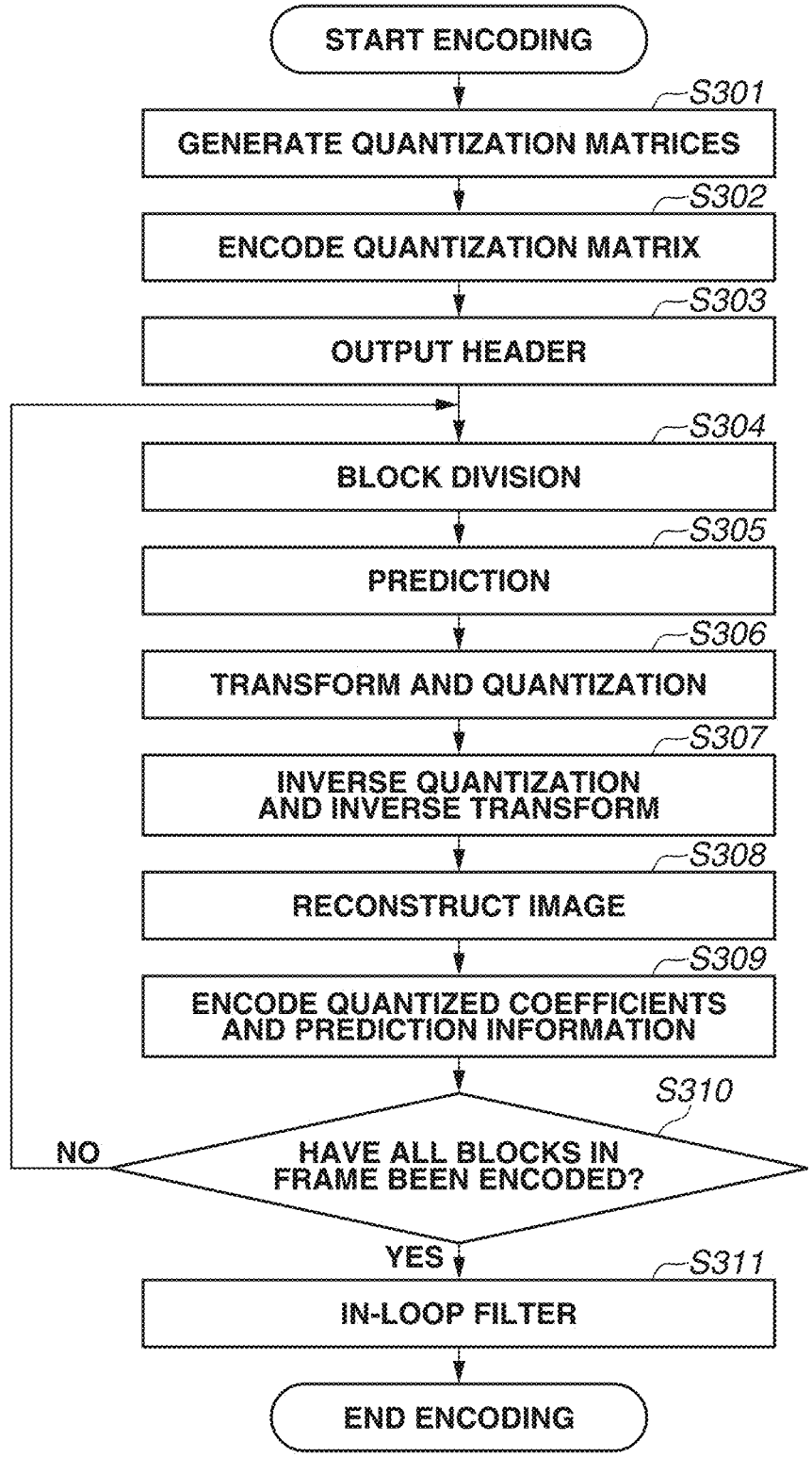
FIG. 3 is a flowchart illustrating image encoding processing by the image encoding apparatus according to the first exemplary embodiment.

FIG. 3 is a flowchart illustrating the encoding processing by the image encoding apparatus according to the first exemplary embodiment.

In step S301, the quantization matrix storage unit 103 initially generates two-dimensional quantization matrices and stores the two-dimensional quantization matrices before image encoding. In the present exemplary embodiment, the quantization matrix storage unit 103 generates the base quantization matrix illustrated in FIG. 8A and the quantization matrices illustrated in FIGS. 8B and 8C generated from the base quantization matrix, and stores the base quantization matrix and the quantization matrices.

In step S302, the quantization matrix encoding unit 113 scans the base quantization matrix used in generating the quantization matrices in step S301 to calculate differences between the elements adjoining in the scan order, and generates a one-dimensional difference matrix. In the present exemplary embodiment, with respect to the base quantization matrix illustrated in FIG. 8A, the scanning method of FIG. 9 is used to generate the difference matrix illustrated in FIG. 10. The quantization matrix encoding unit 113 further encodes the generated difference matrix to generate quantization matrix code data.

In step S303, the integration and encoding unit 111 encodes the header information needed to encode image data along with the generated quantization matrix code data, and outputs the resultant.

In step S304, the block division unit 102 divides a frame-by-frame input image into basic blocks of a 64×64 array of pixels.

In step S305, the prediction unit 104 generates prediction information, such as subblock division information and the prediction mode, and predicted image data by performing prediction processing on the image data in units of basic blocks generated in step S304, using the foregoing prediction method. In the present exemplary embodiment, two types of block sizes, namely, that of a pixel subblock of a 32×32-array illustrated in FIG. 7B and that of a pixel subblock of a 64×64 array illustrated in FIG. 7A are used. The prediction unit 104 further calculates prediction residuals from the input image data and the predicted image data.

In step S306, the transform and quantization unit 105 orthogonally transforms the prediction residuals calculated in step S305 to generate orthogonal transform coefficients. The transform and quantization unit 105 further generates quantized coefficients by performing quantization using the quantization matrices generated and stored in step S301 and the quantization parameter. Specifically, the transform and quantization unit 105 performs the multiplication for the prediction residuals of a pixel subblock of a 32×32 array illustrated in FIG. 7B by using the orthogonal transform matrix of a 32×32 array and its transpose to generate a 32×32 array of orthogonal transform coefficients. On the other hand, the transform and quantization unit 105 performs the multiplication for the prediction residuals of a pixel subblock of a 64×64 array illustrated in FIG. 7A by using the orthogonal transform matrix of a 64×32 array and its transpose to generate a 32×32 array of orthogonal transform coefficients. In the present exemplary embodiment, the transform and quantization unit 105 quantizes the 32×32 array of orthogonal transform coefficients by using the quantization matrix of FIG. 8B for the orthogonal transform coefficients of the subblock of a 32×32 array illustrated in FIG. 7B, and by using the quantization matrix of FIG. 8C for the orthogonal transform coefficients of the subblock of a 64×64 array illustrated in FIG. 7A.

In step S307, the inverse quantization and inverse transform unit 106 reconstructs orthogonal transform coefficients by inversely quantizing the quantized coefficients generated in step S306 using the quantization matrices generated and stored in step S301 and the quantization parameter. The inverse quantization and inverse transform unit 106 further performs inverse orthogonal transform on the orthogonal transform coefficients to reconstruct the prediction residuals. In the present step, the inverse quantization processing is performed by using quantization matrices same as those used in step S306. Specifically, for a 32×32 array of quantized coefficients corresponding to the pixel subblock of a 32×32-array of FIG. 7B, the inverse quantization and inverse transform unit 106 perform the inverse quantization processing using the quantization matrix of FIG. 8B to reconstruct a 32×32 array of orthogonal transform coefficients. The inverse quantization and inverse transform unit 106 then performs the multiplication for the 32×32 array of orthogonal transform coefficients by using the orthogonal transform matrix of a 32×32 array and its transpose to reconstruct 32×32 array pixels of prediction residuals. On the other hand, with a 32×32 array of quantized coefficients corresponding to the subblock of a 64×64-array of pixels of FIG. 7A, the inverse quantization and inverse transform unit 106 performs inverse quantization processing using the quantization matrix of FIG. 8C to reconstruct a 32×32 array of orthogonal transform coefficients. The inverse quantization and inverse transform unit 106 then performs the multiplication for the 32×32 array of orthogonal transform coefficients by using the orthogonal transform matrix of a 64×32 array and its transpose to reconstruct a 64×64 array of pixels of prediction residuals.

In step S308, the image reconstruction unit 107 reconstructs a predicted image based on the prediction information generated in step S305. The image reconstruction unit 107 further reconstructs image data from the reconstructed predicted image and the prediction residuals generated in step S307.

In step S309, the encoding unit 110 encodes the prediction information generated in step S305 and the quantized coefficients generated in step S306 to generate code data. The encoding unit 110 generates a bitstream by including other code data as well.

In step S310, the image encoding apparatus determines whether all the basic blocks in the frame have been encoded. If all the basic blocks have been encoded, the processing proceeds to step S311. If not, the processing returns to step S304 with the next block as a target.

In step S311, the in-loop filter unit 109 performs the in-loop filter processing on the image data reconstructed in step S308 to generate a filter-processed image. The processing ends.

By the foregoing configuration and operation, quantization of each frequency component can be controlled to improve subjective image quality while reducing the amount of computation. In particular, the quantization of each frequency component can be controlled to improve subjective image quality while reducing the amount of computation by reducing the number of orthogonal transform coefficients and performing the quantization processing using a quantization matrix corresponding to the reduced orthogonal transform coefficients in step S306. Moreover, if the number of orthogonal transform coefficients is reduced to quantize and encode only a low frequency section, quantization control optimum to the low frequency section can be implemented by using a quantization matrix obtained by expanding only the low frequency section of the base quantization matrix like FIG. 8C. In the example of FIG. 8C, the low frequency section here refers to the range of x-coordinates of 0 to 3 and y-coordinates of 0 to 3.

In the present exemplary embodiment, to reduce the amount of code, the quantization matrix encoding unit 113 is configured to encode only the base quantization matrix of FIG. 8A that is commonly used in generating the quantization matrices of FIGS. 8B and 8C. However, the quantization matrix encoding unit 113 may be configured to encode the quantization matrices of FIGS. 8B and 8C themselves. This enables finer quantization control on each frequency component since distinctive values can be set for the respective frequency components of the quantization matrices. Alternatively, respective different base quantization matrices may be set for the quantization matrices of FIGS. 8B and 8C, and the quantization matrix encoding unit 113 may be configured to encode the respective base quantization matrices. In such a case, respective different quantization controls can be performed on a 32×32 array of orthogonal transform coefficients and a 64×64 array of orthogonal transform coefficients to implement more elaborate control of subjective image quality. Moreover, in such a case, the quantization matrix corresponding to the 64×64 array of orthogonal transform coefficients may be obtained by expanding the entire base quantization matrix of a 8×8 array fourfold instead of expanding the top left 4×4 array section of the base quantization matrix of a 8×8 array eightfold. This enables finer quantization control on the 64×64 array of orthogonal transform coefficients as well.

Figure 6B:
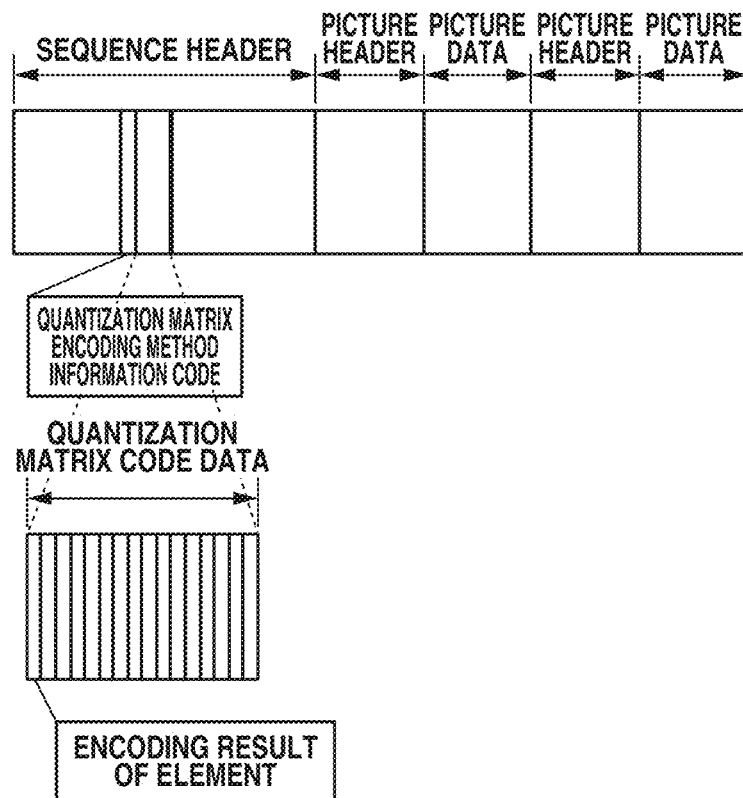
FIG. 6B is a diagram illustrating an example of a bitstream output in the first exemplary embodiment.

Moreover, while the present exemplary embodiment is configured so that the quantization matrix for a subblock of a 64×64 array to be zeroed out is uniquely determined, an identifier may be introduced to enable selection. For example, FIG. 6B illustrates a bitstream where a quantization matrix encoding method information code is newly introduced to make the quantization matrix encoding of a subblock of a 64×64 array to be zeroed out selective. For example, if the quantization matrix encoding method information code indicates 0, FIG. 8C that is an independent quantization matrix is used for the orthogonal transform coefficients corresponding to the subblock of a 64×64-array of pixels to be zeroed out. If the encoding method information code indicates 1, FIG. 8B that is a quantization matrix for an ordinary subblock not to be zeroed out is used for the subblock of a 64×64-array of pixels to be zeroed out. If the encoding method information code indicates 2, all the elements of the quantization matrix to be used for the subblock of a 64×64-array of pixels to be zeroed out are encoded instead of those of the base quantization matrix of a 8×8 array. This can implement a reduction in the amount of quantization matrix code and distinctive quantization control on a subblock to be zeroed out in a selective manner.

In the present exemplary embodiment, the subblocks processed by zeroing out are only ones of a 64×64 array. However, the subblocks to be processed by zeroing out are not limited thereto. For example, among the orthogonal transform coefficients corresponding to a 32×64 or 64×32 array subblock illustrated in FIG. 7C or 7D, the 32×32 array of orthogonal transform coefficients in the lower half or right half may be forcefully set to 0. In such a case, only the 32×32 array of orthogonal transform coefficients in the upper half or left half is quantized and encoded. The quantization processing on the 32×32 array of orthogonal transform coefficients in the upper half or left half is performed by using a quantization matrix different from that of FIG. 8B.

Figure 12B:
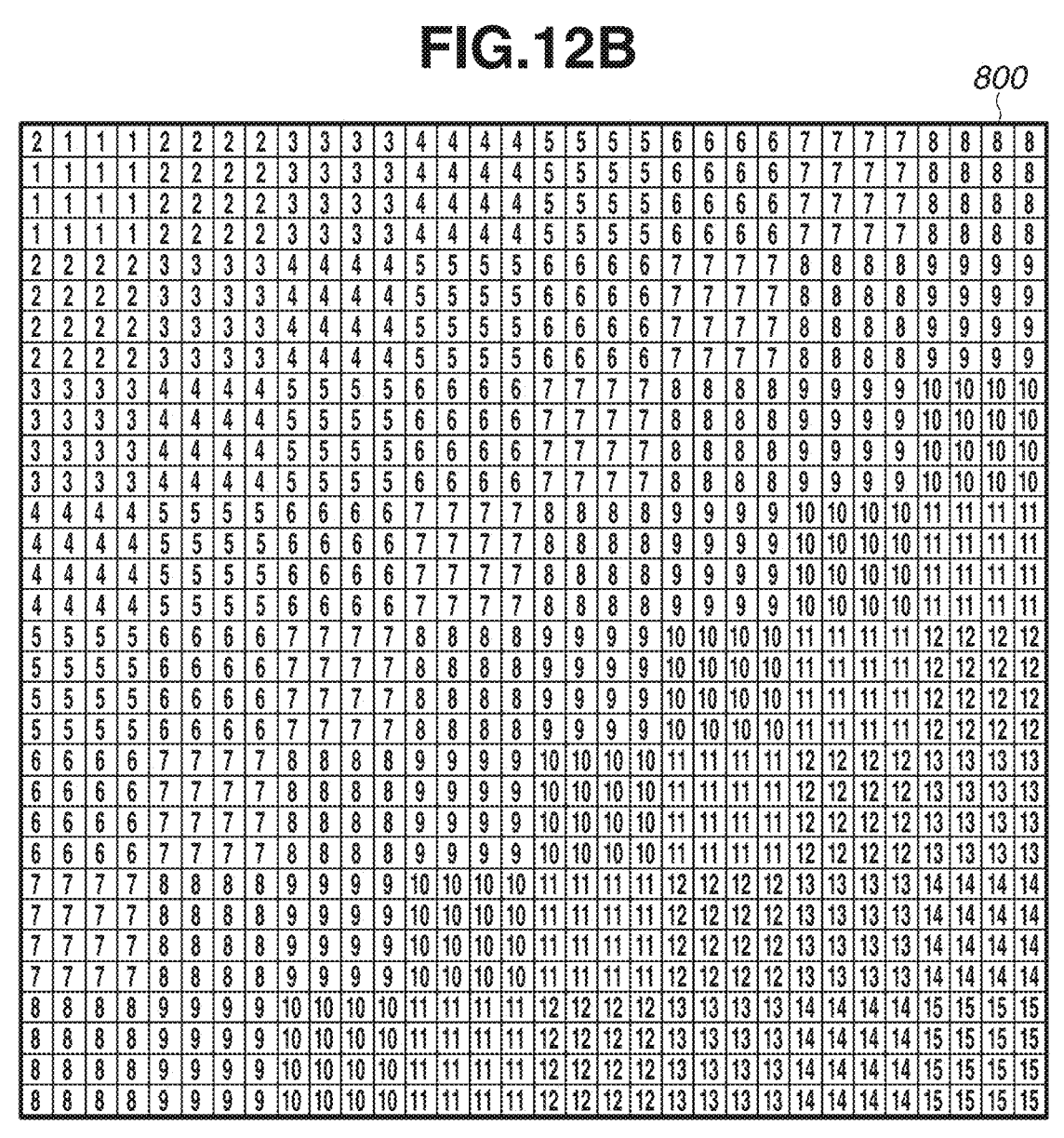
Figure 12C:
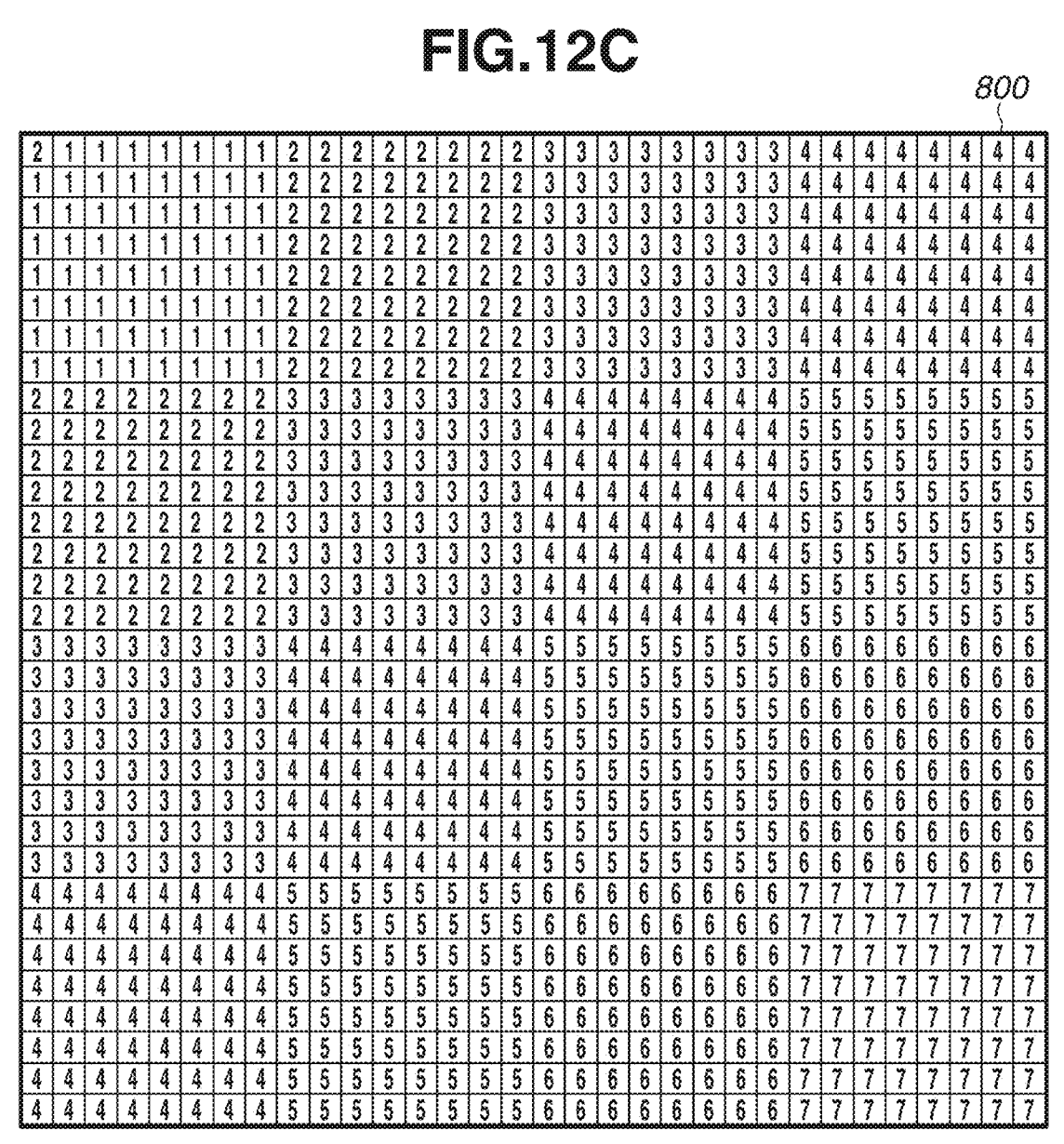

Moreover, the values of the quantization matrices corresponding to the DC coefficient at the top left of the generated orthogonal transform coefficients, considered to have the greatest impact on image quality, may be set and encoded separately from the values of the elements of the base matrix of a 8×8 array. FIGS. 12B and 12C illustrate examples where the value of the top leftmost element corresponding to the DC component is changed from in FIGS. 8B and 8C. In such a case, the quantization matrices illustrated in FIGS. 12B and 12C can be set by encoding information indicating "2" at the position of the DC part aside from the information about the base quantization matrix of FIG. 8A. This enables finer quantization control on the DC component of the orthogonal transform coefficient having the greatest impact on image quality.

Second Exemplary Embodiment

Figure 2:
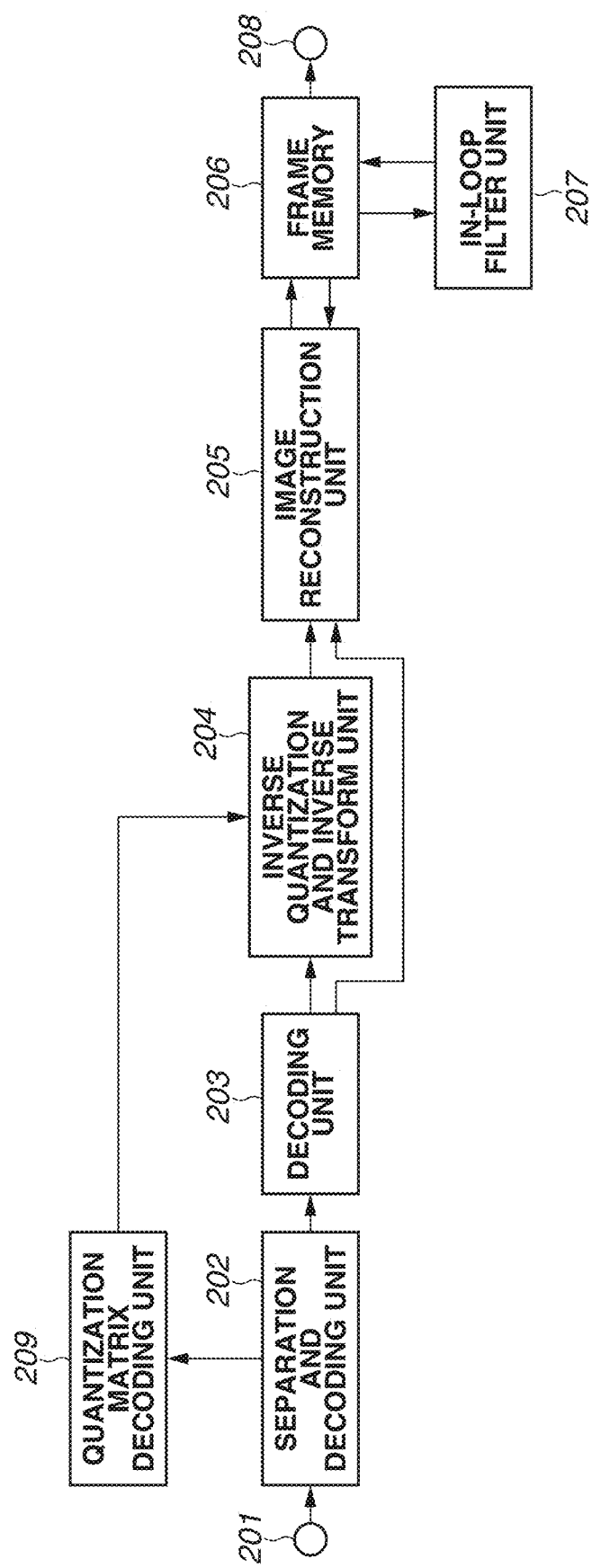
FIG. 2 is a block diagram illustrating a configuration of an image decoding apparatus according to a second exemplary embodiment.

FIG. 2 is a block diagram illustrating a configuration of an image decoding apparatus according to a second exemplary embodiment of the present invention. The present exemplary embodiment will be described by using an image decoding apparatus for decoding encoded data generated in the first exemplary embodiment as an example.

An encoded bitstream is input into a terminal 201.

A separation and decoding unit 202 separates the bitstream into information about decoding processing and code data related to coefficients, and decodes the code data included in the header section of the bitstream. In the present exemplary embodiment, the separation and decoding unit 202 separates quantization matrix code and outputs the quantization matrix code to a subsequent stage. The separation and decoding unit 202 performs operation reverse to that of the integration and encoding unit 111 of FIG. 1.

A quantization matrix decoding unit 209 performs processing for decoding the quantization matrix code from the bitstream to reconstruct a base quantization matrix, and further generating quantization matrices from the base quantization matrix.

A decoding unit 203 decodes the code data output from the separation and decoding unit 202 to reconstruct (derive) quantized coefficients and prediction information.

An inverse quantization and inverse transform unit 204, like the inverse quantization and inverse transform unit 106 of FIG. 1, obtains orthogonal transform coefficients by inversely quantizing the quantized coefficients using the reconstructed quantization matrices and a quantization parameter, and further performs inverse orthogonal transform to reconstruct a prediction residuals. Information for deriving the quantization parameter is also decoded from the bitstream by the decoding unit 203. The function of performing inverse quantization and the function of performing inverse quantization may be configured as separate configurations.

A frame memory 206 stores image data on the reconstructed picture.

An image reconstruction unit 205 generates predicted image data by referring to the frame memory 206 as appropriate based on the input prediction information. The image reconstruction unit 205 then generates reconstructed image data from the predicted image data and the prediction residuals reconstructed by the inverse quantization and inverse transform unit 204, and outputs the reconstructed image data.

An in-loop filter unit 207, like 109 of FIG. 1, performs in-loop filter processing such as deblocking filtering on the reconstructed image, and outputs the filter-processed image.

A terminal 208 outputs the reconstructed image data to outside.

An image decoding operation of the foregoing image decoding apparatus will be described below. In the present exemplary embodiment, the image decoding apparatus is configured to input the bitstream generated in the first exemplary embodiment frame by frame (picture by picture).

In FIG. 2, one frame of bitstream input from the terminal 201 is input into the separation and decoding unit 202. The separation and decoding unit 202 separates the bitstream into information about the decoding processing and code data related to coefficients, and decodes the code data included in the header section of the bitstream. More specifically, the separation and decoding unit 202 reconstructs quantization matrix code data. In the present exemplary embodiment, the separation and decoding unit 202 initially extracts the quantization matrix code data from the sequence header of the bitstream illustrated in FIG. 6A, and outputs the quantization matrix code data to the quantization matrix decoding unit 209. In the present exemplary embodiment, the quantization matrix code data corresponding to the base quantization matrix illustrated in FIG. 8A is extracted and output. The separation and decoding unit 202 then reconstructs code data on picture data in units of basic blocks, and outputs the code data to the decoding unit 203.

The quantization matrix decoding unit 209 initially decodes the input quantization matrix code data to reconstruct the one-dimensional difference matrix illustrated in FIG. 10. In the present exemplary embodiment, like the first exemplary embodiment, the quantization matrix code data is decoded by using the encoding table illustrated in FIG. 11A. However, the encoding table is not limited thereto, and other encoding tables may be used as long as the same encoding tables are used in the first exemplary embodiment. The quantization matrix decoding unit 209 further reconstructs a two-dimensional quantization matrix from the reconstructed one-dimensional difference matrix. Here, the quantization matrix decoding unit 209 performs operation reverse to that of the quantization matrix encoding unit 113 according to the first exemplary embodiment. More specifically, in the present exemplary embodiment, with respect to the difference matrix illustrated in FIG. 10, the base quantization matrix illustrated in FIG. 8A is reconstructed and stored by using the scanning method illustrated in FIG. 9. Specifically, the quantization matrix decoding unit 209 sequentially adds the difference values in the difference matrix to the foregoing initial value to reconstruct the elements of a quantization matrix. The quantization matrix decoding unit 209 then reconstructs a two-dimensional quantization matrix by associating the reconstructed one-dimensional elements with the respective elements of the two-dimensional quantization matrix in order based on the scanning method illustrated in FIG. 9.

The quantization matrix decoding unit 209 further expands the reconstructed base quantization matrix as in the first exemplary embodiment to generate the two types of quantization matrices of a 32×32 array illustrated in FIGS. 8B and 8C. The quantization matrix of FIG. 8B is a quantization matrix of a 32×32 array expanded fourfold by vertically and horizontally repeating each element of the base quantization matrix of a 8×8 array of FIG. 8A four times.

On the other hand, the quantization matrix of FIG. 8C is a quantization matrix of a 32×32 array expanded by vertically and horizontally repeating each element of the top left 4×4 array section of the base quantization matrix of FIG. 8A eight times. Note that the quantization matrices to be generated are not limited thereto. If there is any size of quantized coefficients to be inversely quantized in a subsequent stage other than a 32×32, array quantization matrices corresponding to the size of the quantized coefficients to be inversely quantized, such as 16×16, 8×8, and 4×4 arrays, may be generated. The generated quantization matrices are stored and used in inverse quantization processing in a subsequent stage.

The decoding unit 203 decodes the code data from the bitstream and reconstructs quantized coefficients and prediction information. The decoding unit 203 determines the size of the subblock(s) to be decoded based on the decoded prediction information, and further outputs the reconstructed quantized coefficients to the inverse quantization and inverse transform unit 204 and the reconstructed prediction information to the image reconstruction unit 205. In the present exemplary embodiment, a 32×32 array of quantized coefficients is reconstructed for each subblock to be decoded regardless of the size of the subblock, i.e., whether the size is a 64×64 array as in FIG. 7A or a 32×32 array as in FIG. 7B.

The inverse quantization and inverse transform unit 204 generates orthogonal transform coefficients by inversely quantizing the input quantized coefficients using the quantization matrices reconstructed by the quantization matrix decoding unit 209 and the quantization parameter, and further applies inverse orthogonal transform to reconstruct a prediction residuals. More detailed inverse quantization and inverse orthogonal transform processing is described below.

If the 32×32 array subblock division of FIG. 7B is selected, the 32×32 array of quantized coefficients reconstructed by the decoding unit 203 is inversely quantized by using the quantization matrix of FIG. 8B to reconstruct a 32×32 array of orthogonal transform coefficients. The foregoing transpose of a 32×32 array and the 32×32 array of orthogonal transform coefficients are then multiplied to calculate intermediate coefficients in a form of a matrix of a 32×32 array. The intermediate coefficients in the form of a matrix of a 32×32 array and the foregoing orthogonal transform matrix of a 32×32 array are multiplied to reconstruct a 32×32 array of prediction residuals. Similar processing is performed on each subblock of a 32×32 array.

On the other hand, if no division is selected as in FIG. 7A, the a 32×32 array of quantized coefficients reconstructed by the decoding unit 203 is inversely quantized by using the quantization matrix of FIG. 8C to reconstruct a 32×32 array of orthogonal transform coefficients. The foregoing transpose of a 32×64 array and the 32×32 array of orthogonal transform coefficients are multiplied to calculate intermediate coefficients in a form of a matrix of a 32×64 array. The intermediate coefficients in the form of a matrix of a 32×64 array and the foregoing orthogonal transform matrix of a 64×32 array are multiplied to reconstruct a 64×64 array of prediction residuals.

The reconstructed prediction residuals are output to the image reconstruction unit 205. In the present exemplary embodiment, the quantization matrix to be used in the inverse quantization processing is determined based on the size of the subblock to be decoded determined by the prediction information reconstructed by the decoding unit 203. More specifically, for each of the subblocks of a 32×32 array in FIG. 7B, the quantization matrix of FIG. 8B is used in the inverse quantization processing. The quantization matrix of FIG. 8C is used for the subblock of a 64×64 array of FIG. 7A. Note that the quantization matrices to be used are not limited thereto as long as the same quantization matrices are used by the transform and quantization unit 105 and the inverse quantization and inverse transform unit 106 in the first exemplary embodiment.

The image reconstruction unit 205 obtains data needed to reconstruct a predicted image by referring to the frame memory 206 as appropriate based on the prediction information input from the decoding unit 203, and reconstructs the predicted image. In the present exemplary embodiment, the image reconstruction unit 205 uses the two types of prediction methods, namely, intra-prediction and inter-prediction like the prediction unit 104 of the first exemplary embodiment. As described above, a prediction method combining intra-prediction and inter-prediction may be used. Like the first exemplary embodiment, the prediction processing is performed in units of subblocks.

Since the specific prediction processing is similar to that of the prediction unit 104 according to the first exemplary embodiment, a description thereof will be omitted. The image reconstruction unit 205 reconstructs image data from the predicted image generated by the prediction processing and the prediction residuals input from the inverse quantization and inverse transform unit 204. Specifically, the image reconstruction unit 205 reconstructs the image data by adding the predicted image and the prediction residuals. The reconstructed image data is stored into the frame memory 206 as appropriate. The stored image data is referred to as appropriate in predicting other subblocks.

Like the in-loop filter unit 109 of FIG. 1, the in-loop filter unit 207 reads the reconstructed image from the frame memory 206 and performs in-loop filter processing such as deblocking filtering. The filter-processed image is input into the frame memory 206 again.

The reconstructed image stored in the frame memory 206 is eventually output to outside from the terminal 208. For example, the reconstructed image is output to an external display device and the like.

Figure 4:
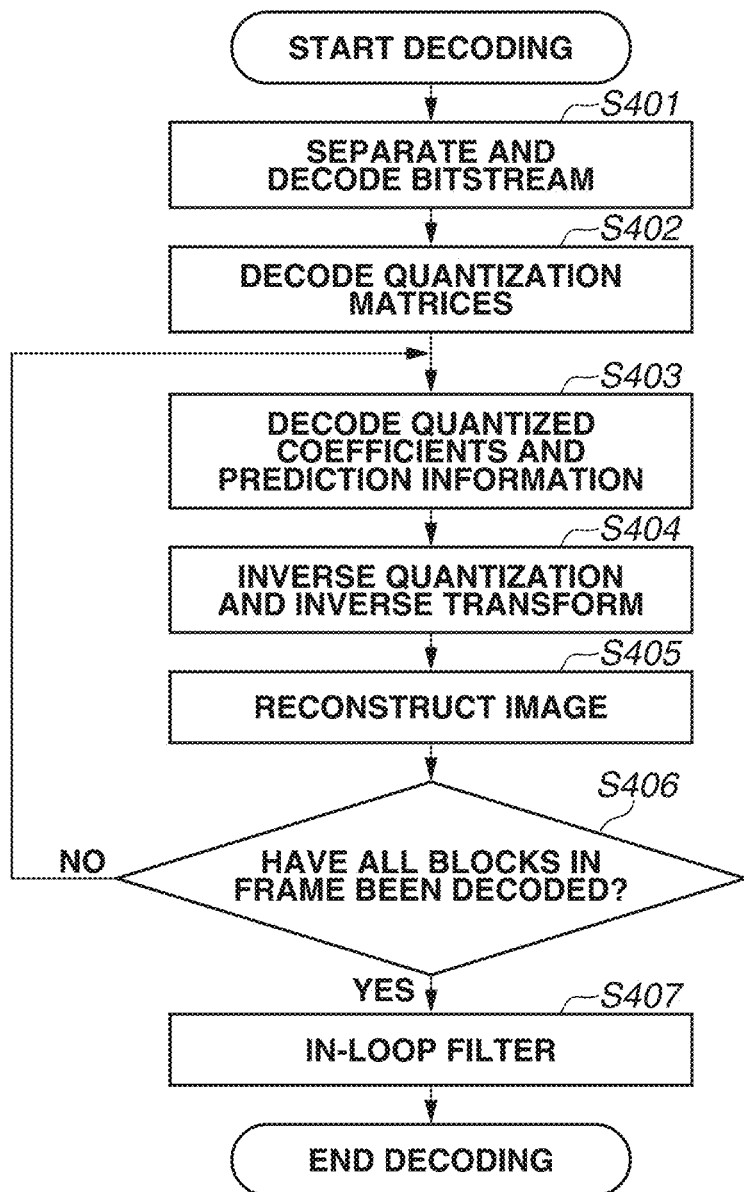
FIG. 4 is a flowchart illustrating image decoding processing by the image decoding apparatus according to the second exemplary embodiment.

FIG. 4 is a flowchart illustrating image decoding processing by the image decoding apparatus according to the second exemplary embodiment.

In step S401, the separation and decoding unit 202 initially separates the bitstream into information about the decoding processing and code data related to coefficients, and decodes the code data in the header section. More specifically, the separation and decoding unit 202 reconstructs quantization matrix code data.

In step S402, the quantization matrix decoding unit 209 initially decodes the quantization matrix code data reconstructed in step S401 to reconstruct the one-dimensional difference matrix illustrated in FIG. 10. Next, the quantization matrix decoding unit 209 reconstructs the two-dimensional base quantization matrix from the reconstructed one-dimensional difference matrix. The quantization matrix decoding unit 209 further expands the reconstructed two-dimensional base quantization matrix to generate the quantization matrices.

More specifically, in the present exemplary embodiment, the quantization matrix decoding unit 209 reconstructs the base quantization matrix illustrated in FIG. 8A from the difference matrix illustrated in FIG. 10 by using the scanning method illustrated in FIG. 9. The quantization matrix decoding unit 209 further expands the reconstructed base quantization matrix to generate the quantization matrices illustrated in FIGS. 8B and 8C, and stores the quantization matrices.

In step S403, the decoding unit 203 decodes the code data separated in step S401 to reconstruct quantized coefficients and prediction information. The decoding unit 203 further determines the size of the subblock(s) to be decoded based on the decoded prediction information. In the present exemplary embodiment, a 32×32 array of quantized coefficients is reconstructed for each subblock to be decoded regardless of the size of the subblock, i.e., whether the size is a 64×64 array as in FIG. 7A or a 32×32 array as in FIG. 7B.

In step S404, the inverse quantization and inverse transform unit 204 obtains orthogonal transform coefficients by inversely quantizing the quantized coefficients using the quantization matrices reconstructed in step S402, and further performs inverse orthogonal transform to reconstruct a prediction residuals. In the present exemplary embodiment, the quantization matrix to be used in the inverse quantization processing is determined based on the size of the subblock(s) to be decoded determined by the prediction information reconstructed in step S403. More specifically, for each of the subblocks of a 32×32 array in FIG. 7B, the quantization matrix of FIG. 8B is used in the inverse quantization processing. The quantization matrix of FIG. 8C is used for the subblock of a 64×64 array of FIG. 7A. Note that the quantization matrices to be used are not limited thereto as long as the same quantization matrices are used in steps S306 and S307 of the first exemplary embodiment.

In step S405, the image reconstruction unit 205 reconstructs a predicted image from the prediction information generated in step S403. In the present exemplary embodiment, like step S305 of the first exemplary embodiment, the two types of prediction methods, namely, intra-prediction and inter-prediction are used. The image reconstruction unit 205 further reconstructs image data from the reconstructed predicted image and the prediction residuals generated in step S404.

In step S406, the image decoding apparatus determines whether all the basic blocks in the frame have been decoded. If all the basic blocks have been decoded, the processing proceeds to step S407. If not, the processing returns to step S403 with the next basic block as a target.

In step S407, the in-loop filter 207 performs the in-loop filter processing on the image data reconstructed in step S405 to generate a filter-processed image. The processing ends.

By the foregoing configuration and operation, a bitstream generated in the first exemplary embodiment, where quantization of each frequency component is controlled to improve subjective image quality using the quantization matrices even in subblocks of which only the low-frequency orthogonal transform coefficients are quantized and encoded, can be decoded. Moreover, a bitstream with optimum quantization control applied to its low frequency section can be decoded by using a quantization matrix obtained by expanding only the low frequency section of the base quantization matrix, such as that of FIG. 8C, to the subblocks of which only the low-frequency orthogonal transform coefficients are quantized and encoded.

In the present exemplary embodiment, to reduce the amount of code, only the base quantization matrix of FIG. 8A to be commonly used to generate the quantization matrices of FIGS. 8B and 8C is decoded. However, the quantization matrices of FIGS. 8B and 8C themselves may be decoded. This enables decoding of a bitstream with finer quantization control on each frequency component since distinctive values can be set for the respective frequency components of the quantization matrices.

Respective different base quantization matrices may be set for FIGS. 8B and 8C, and the respective base quantization matrices may be encoded. In such a case, respective different quantization controls can be performed on a 32×32 array of orthogonal transform coefficients and a 64×64 array of orthogonal transform coefficients to decode a bitstream with more elaborate control of subjective image quality. Moreover, in such a case, the quantization matrix corresponding to the 64×64 array of orthogonal transform coefficients may be obtained by expanding the entire base quantization matrix of a 8×8 array fourfold instead of expanding the top left 4×4 array section of the base quantization matrix of a 8×8 array eightfold. This enables finer quantization control on the 64×64 array of orthogonal transform coefficients as well.

Moreover, while the present exemplary embodiment is configured so that the quantization matrix for a subblock of a 64×64 array to be zeroed out is uniquely determined, an identifier may be introduced to enable selection. For example, FIG. 6B illustrates a bitstream where a quantization matrix encoding method information code is newly introduced to make the quantization matrix encoding of a subblock of a 64×64 array to be zeroed out selective. For example, if the quantization matrix encoding method information code indicates 0, FIG. 8C that is an independent quantization matrix is used for the quantized coefficients corresponding to the subblock of a 64×64 array to be zeroed out. If the encoding method information code indicates 1, FIG. 8B that is a quantization matrix for an ordinary subblock not to be zeroed out is used for the subblock of a 64×64 array to be zeroed out. If the encoding method information code indicates 2, all the elements of the quantization matrix to be used for the subblock of a 64×64 array to be zeroed out are encoded instead of those of the base quantization matrix of a 8×8 array. This enables decoding of a bitstream where a reduction in the amount of quantization matrix code and independent quantization control on a subblock to be zeroed out are implemented in a selective manner.

In the present exemplary embodiment, the subblocks processed by zeroing out are only ones of a 64×64 array. However, the subblocks processed by zeroing out are not limited thereto. For example, among the orthogonal transform coefficients corresponding to a subblock of a 32×64 or 64×32 array illustrated in FIG. 7C or 7D, only the quantized coefficients in the upper half or left half may be decoded without decoding the 32×32 array of orthogonal transform coefficients in the lower half or right half. In such a case, only the 32×32 array of orthogonal transform coefficients in the upper half or left half is decoded and inversely quantized. The quantization processing on the 32×32 array of orthogonal transform coefficients in the upper half or left half is performed by using a quantization matrix different from that of FIG. 8B.

Moreover, the values of the quantization matrices corresponding to the DC coefficient at the top left of the generated orthogonal transform coefficients, considered to have the greatest impact on image quality, are decoded and set separately from the values of the elements of the base matrix of a 8×8 array. FIGS. 12B and 12C illustrate examples where the value of the top leftmost element corresponding to the DC component is changed from in FIGS. 8B and 8C. In such a case, the quantization matrices illustrated in FIGS. 12B and 12C can be set by decoding information indicating "2" at the position of the DC part aside from the information about the base quantization matrix of FIG. 8A. This enables decoding of a bitstream with finer quantization control on the DC component of the orthogonal transform coefficient having the greatest impact on image quality.

Third Exemplary Embodiment

In the foregoing exemplary embodiments, the processing units illustrated in FIGS. 1 and 2 have been described to be constituted by hardware. However, the processes performed by the respective processing units illustrated in these diagrams may be constituted by computer programs.

Figure 5:
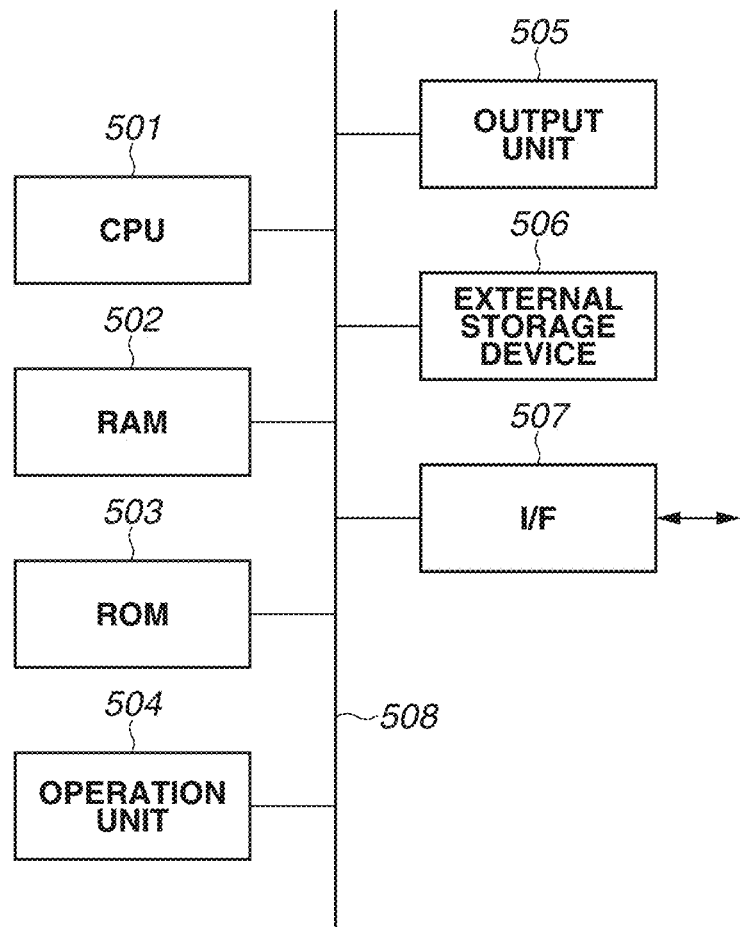
FIG. 5 is a block diagram illustrating a hardware configuration example of a computer applicable to the image encoding apparatus and the image decoding apparatus according to the present invention.

FIG. 5 is a block diagram illustrating a hardware configuration example of a computer applicable to the image encoding apparatus and the image decoding apparatus according to the foregoing exemplary embodiments.

A central processing unit (CPU) 501 controls the entire computer by using computer programs and data stored in a random access memory (RAM) 502 and a read-only memory (ROM) 503, and executes the processes described above to be performed by the apparatuses according to the exemplary embodiments. In other words, the CPU 501 functions as the processing units illustrated in FIGS. 1 and 2.

The RAM 502 includes an area for temporarily storing computer programs and data loaded from an external storage device 506, data obtained from outside via an interface (I/F) 507, and the like. The RAM 502 also includes a work area for the CPU 501 to use in executing various processes. In other words, the RAM 502 can be allocated as a frame memory, for example, and provide other various areas as appropriate.

The ROM 503 stores setting data, a boot program, and the like of the computer. An operation unit 504 includes a keyboard and a mouse. The user of the computer can input various instructions into the CPU 501 by operating the operation unit 504. An output unit 505 outputs a result of processing by the CPU 501. The output unit 505 includes a liquid crystal display, for example.

The external storage device 506 is a large-capacity information storage device typified by a hard disk drive device. The external storage device 506 stores an operating system (OS) and computer programs for causing the CPU 501 to implement the functions of the units illustrated in FIGS. 1 and 2. The external storage device 506 may further store pieces of image data to be processed.

The computer programs and data stored in the external storage device 506 are loaded into the RAM 502 as appropriate based on control by the CPU 501, and subjected to processing by the CPU 501. Networks, such as a local area network (LAN) and the Internet, and other devices, such as a projection device and a display device, can be connected to the I/F 507. The computer can obtain and transmit various types of information via the I/F 507. A bus 508 connects the foregoing units.

The activation of the foregoing configuration, or the activation described in the foregoing flowcharts, is controlled mainly by the CPU 501.

OTHER EXEMPLARY EMBODIMENTS

The exemplary embodiments can also be implemented by supplying a storage medium in which computer program code for implementing the foregoing functions is recorded to a system, and reading and executing the computer program code by the system. In such a case, the computer program code itself read from the storage medium implements the functions of the foregoing exemplary embodiments, and the storage medium storing the computer program code constitutes the present invention. A case where an operating system (OS) and the like running on a computer perform part or all of actual processing based on instructions in the program code and the foregoing functions are implemented by the processing is also included.

An exemplary embodiment may also be implemented in the following manner. That is, computer program code read from a storage medium is written into a memory included in a function extension card inserted into the computer or a function extension unit connected to the computer. A CPU and the like included in the function extension card or the function extension unit then performs part or all of actual processing based on instructions in the computer program code, and thereby implement the foregoing functions. Such a case is also included.

If the present invention is applied to the foregoing storage medium, the storage medium stores computer program code corresponding to the flowcharts described above.

According to the foregoing exemplary embodiments, subjective image quality can be improved despite the use of the technique of forcefully setting some of orthogonal transform coefficients to 0, by enabling quantization processing using a quantization matrix corresponding to the technique.

The present invention is not limited to the above embodiments and various changes and modifications can be made within the spirit and scope of the present invention. Therefore, to apprise the public of the scope of the present invention, the following claims are made.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image decoding apparatus capable of decoding an image from a bitstream using a plurality of blocks including a first block of a P×Q (P and Q are integers) array of pixels and a second block of an N×M (N is an integer satisfying N<P, and M is an integer satisfying M<Q) array of pixels, the image decoding apparatus comprising:

a decoding unit configured to decode data corresponding to a first array of quantized transform coefficients and data corresponding to a second array of quantized transform coefficients from the bitstream, the first array of quantized transform coefficients corresponding to the first block, the second array of quantized transform coefficients corresponding to the second block;

an inverse quantization unit configured to derive a first array of transform coefficients from the first array of quantized transform coefficients by using a first quantization matrix of an N×M array of elements, and derive a second array of transform coefficients from the second array of quantized transform coefficients by using a second quantization matrix of an N×M array of elements, wherein the first array of transform coefficients represents frequency components, and wherein the second array of transform coefficients represents frequency components;

an inverse transform unit configured to derive a first array of prediction residuals corresponding to the first block by performing inverse transform processing on the first array of transform coefficients, and derive a second array of prediction residuals corresponding to the second block by performing inverse transform processing on the second array of transform coefficients; and a picture reconstruction unit configured to reconstruct at least picture data based on the first array of prediction residuals and predicted image data, the predicted image data being capable of being derived by using intra prediction, wherein the first quantization matrix of the N×M array of elements is a quantization matrix including a part of elements of a third quantization matrix of an R×S array (R is an integer satisfying R≤N, and S is an integer satisfying S≤M) of elements, and not including the other elements of the third quantization matrix, wherein the second quantization matrix of the N×M array of elements is a quantization matrix including all elements of a fourth quantization matrix of the R×S array of elements, and wherein the third quantization matrix is different from the fourth quantization matrix.

2. An image decoding method capable of decoding an image from a bitstream using a plurality of blocks including a first block of a P×Q (P and Q are integers) array of pixels and a second block of an N×M (N is an integer satisfying N<P, and M is an integer satisfying M<Q) array of pixels, the image decoding method comprising:

decoding data corresponding to a first array of quantized transform coefficients and data corresponding to a second array of quantized transform coefficients from the bitstream, the first array of quantized transform coefficients corresponding to the first block, the second array of quantized transform coefficients corresponding to the second block;

deriving a first array of transform coefficients from the first array of quantized transform coefficients by using a first quantization matrix of an N×M array of elements, and deriving a second array of transform coefficients from the second array of quantized transform coefficients by using a second quantization matrix of an N×M array of elements, wherein the first array of transform coefficients represents frequency components, and wherein the second array of transform coefficients represents frequency components;

deriving a first array of prediction residuals corresponding to the first block by performing inverse transform processing on the first array of transform coefficients, and deriving a second array of prediction residuals corresponding to the second block by performing inverse transform processing on the second array of transform coefficients; and reconstructing at least picture data based on the first array of prediction residuals and predicted image data, the predicted image data being capable of being derived by using intra prediction, wherein the first quantization matrix of the N×M array of elements is a quantization matrix including a part of elements of a third quantization matrix of an R×S array (R is an integer satisfying R≤N, and S is an integer satisfying S≤M) of elements, and not including the other elements of the third quantization matrix, wherein the second quantization matrix of the N×M array of elements is a quantization matrix including all elements of a fourth quantization matrix of the R×S array of elements, and wherein the third quantization matrix is different from the fourth quantization matrix.

3. The image decoding method according to claim 2, wherein the first quantization matrix is a quantization matrix where elements other than elements corresponding to a DC component include the part of elements of the third quantization matrix, and wherein the second quantization matrix is a quantization matrix where elements other than elements corresponding to a DC component include all the elements of the fourth quantization matrix.

4. The image decoding method according to claim 2, wherein the first array of transform coefficients includes an N×M array of transform coefficients, and wherein the second array of transform coefficients includes an N×M array of transform coefficients.

5. The image decoding method according to claim 2, wherein the first and second blocks are non-square blocks.

6. The image decoding method according to claim 2, wherein the first array of prediction residuals is a P×Q array of prediction residuals, and wherein the second array of prediction residuals is an N×M array of prediction residuals.

7. The image decoding method according to claim 2, wherein the first array of transform coefficients is an N×M array of transform coefficients, wherein the first array of prediction residuals is a P×Q array of prediction residuals, and wherein the first array of prediction residuals is derived from the first array of transform coefficients by the inverse transform processing on the first array of transform coefficients.

8. The image decoding method according to claim 7, wherein the inverse transform processing includes multiplication of the first array of transform coefficients and a matrix of an M×Q array to thereby derive an N×Q array of intermediate values, and includes multiplication of a matrix of a P×N array and the N×Q array of intermediate values to thereby derive the first array of prediction residuals from the first array of transform coefficients.

9. A non-transitory computer readable storage medium storing a program for causing a computer to function as the units of the image decoding apparatus according to claim 1.

10. An image encoding apparatus capable of encoding an image using a plurality of blocks including a first block of a P×Q (P and Q are integers) array of pixels and a second block of an N×M (N is an integer satisfying N<P, and M is an integer satisfying M<Q) array of pixels, the image encoding apparatus comprising:

a transform unit configured to derive a first array of transform coefficients by performing transform processing on a first array of prediction residuals corresponding to the first block, and derive a second array of transform coefficients by performing transform processing on a second array of prediction residuals corresponding to the second block, at least the first array of prediction residuals being capable of being derived by using intra prediction;

a quantization unit configured to derive a first array of quantized transform coefficients by quantizing the first array of transform coefficients using a first quantization matrix of an N×M array of elements, and derive a second array of quantized transform coefficients by quantizing the second array of transform coefficients using a second quantization matrix of an N×M array of elements; and an encoding unit configured to encode data corresponding to the first array of quantized transform coefficients corresponding to the first block and data corresponding to the second array of quantized transform coefficients corresponding to the second block, wherein the first quantization matrix of the N×M array of elements is a quantization matrix including a part of elements of a third quantization matrix of an R×S array (R is an integer satisfying R≤N, and S is an integer satisfying S≤M) of elements, and not including the other elements of the third quantization matrix, wherein the second quantization matrix of the N×M array of elements is a quantization matrix including all elements of a fourth quantization matrix of the R×S array of elements, and wherein the third quantization matrix is different from the fourth quantization matrix.

11. An image encoding method capable of encoding an image using a plurality of blocks including a first block of a P×Q (P and Q are integers) array of pixels and a second block of an N×M (N is an integer satisfying N<P, and M is an integer satisfying M<Q) array of pixels, the image encoding method comprising:

deriving a first array of transform coefficients by performing transform processing on a first array of prediction residuals corresponding to the first block, and deriving a second array of transform coefficients by performing transform processing on a second array of prediction residuals corresponding to the second block, at least the first array of prediction residuals being capable of being derived by using intra prediction;

deriving a first array of quantized transform coefficients by quantizing the first array of transform coefficients using a first quantization matrix of an N×M array of elements, and deriving a second array of quantized transform coefficients by quantizing the second array of transform coefficients using a second quantization matrix of an N×M array of elements; and encoding data corresponding to the first array of quantized transform coefficients corresponding to the first block and data corresponding to the second array of quantized transform coefficients corresponding to the second block, wherein the first quantization matrix of the N×M array of elements is a quantization matrix including a part of elements of a third quantization matrix of an R×S array (R is an integer satisfying R≤N, and S is an integer satisfying S≤M) of elements, and not including the other elements of the third quantization matrix, wherein the second quantization matrix of the N×M array of elements is a quantization matrix including all elements of a fourth quantization matrix of the R×S array of elements, and wherein the third quantization matrix is different from the fourth quantization matrix.

12. The image encoding method according to claim 11, wherein the first quantization matrix is a quantization matrix where elements other than elements corresponding to a DC component include the part of elements of the third quantization matrix, and wherein the second quantization matrix is a quantization matrix where elements other than elements corresponding to a DC component include all the elements of the fourth quantization matrix.

13. The image encoding method according to claim 11, wherein the first array of transform coefficients includes an N×M array of transform coefficients, and wherein the second array of transform coefficients includes an N×M array of transform coefficients.

14. The image encoding method according to claim 11, wherein the first and second blocks are non-square blocks.

15. The image encoding method according to claim 11, wherein the first array of prediction residuals is a P×Q array of prediction residuals, and wherein the second array of prediction residuals is an N×M array of prediction residuals.

16. The image encoding method according to claim 11, wherein the first array of prediction residuals is a P×Q array of prediction residuals, wherein the first array of transform coefficients is an N×M array of transform coefficients, and wherein the first array of transform coefficients is derived from the first array of prediction residuals by the transform processing on the first array of prediction residuals.

17. The image encoding method according to claim 16, wherein the transform processing includes multiplication of the first array of prediction residuals and a matrix of a Q×M array to thereby derive an P×M array of intermediate values, and includes multiplication of a matrix of an N×P array and the P×M array of intermediate values to thereby derive the first array of transform coefficients from the first array of prediction residuals.

18. A non-transitory computer readable storage medium storing a program for causing a computer to function as the units of the image encoding apparatus according to claim 10.

* * * * *